United States Patent
Sato

(10) Patent No.: US 12,231,614 B2
(45) Date of Patent: Feb. 18, 2025

(54) COMMUNICATION TERMINAL DEVICE, COMMUNICATION METHOD, AND SOFTWARE PROGRAM

(71) Applicant: VIRTUALWINDOW CO., LTD., Tokyo (JP)

(72) Inventor: Rui Sato, Tokyo (JP)

(73) Assignee: VIRTUAL WINDOW CO., LTD., Tokyo (JP)

( * ) Notice: Subject to any disclaimer, the term of this patent is extended or adjusted under 35 U.S.C. 154(b) by 105 days.

(21) Appl. No.: 17/919,082

(22) PCT Filed: Apr. 30, 2020

(86) PCT No.: PCT/JP2020/018345
§ 371 (c)(1),
(2) Date: Oct. 14, 2022

(87) PCT Pub. No.: WO2021/220494
PCT Pub. Date: Nov. 4, 2021

(65) Prior Publication Data
US 2023/0164304 A1    May 25, 2023

(51) Int. Cl.
*H04N 13/344* (2018.01)
*G06F 3/01* (2006.01)
(Continued)

(52) U.S. Cl.
CPC ........... *H04N 13/344* (2018.05); *G06F 3/013* (2013.01); *G06F 3/1423* (2013.01); *G06F 3/16* (2013.01);
(Continued)

(58) Field of Classification Search
CPC ........ H04N 7/144; H04N 7/147; H04N 7/157; H04N 9/3185; H04N 13/243;
(Continued)

(56) References Cited

U.S. PATENT DOCUMENTS

| 6,285,392 B1 | 9/2001 | Satoda et al. |
| 10,496,158 B2 | 12/2019 | Terahata |

(Continued)

FOREIGN PATENT DOCUMENTS

| JP | H06-274094 A | 9/1994 |
| JP | H08-167048 A | 6/1996 |

(Continued)

OTHER PUBLICATIONS

Aug. 11, 2020 International Search Report issued in International Patent Application No. PCT/JP2020/018345.
(Continued)

*Primary Examiner* — Wesner Sajous
(74) *Attorney, Agent, or Firm* — Oliff PLC

(57) ABSTRACT

A communication terminal device acquires audio including voice of own user using own device; acquires visual information for enabling formation of three-dimensional data of object in predetermined user space; identifies viewpoint position of own user on basis of visual information on user space; transmits, to another device, image transmission information based on visual information on user space and audio transmission information based on audio; displays, on basis of image transmission information transmitted from other device, on display surface having fixed relative position relative to shared virtual space, in which first virtual space in which user space is fixedly arranged and second virtual space in which user space of other device is fixedly arranged are arranged at predetermined relative positions and relative angles, image of shared virtual space which can be viewed from viewpoint position of own user; and outputs audio on basis of audio transmission information transmitted from other device.

29 Claims, 30 Drawing Sheets

(51) Int. Cl.
*G06F 3/14* (2006.01)
*G06F 3/16* (2006.01)
*G06T 17/20* (2006.01)
*H04N 13/111* (2018.01)

(52) U.S. Cl.
CPC .............. *G06T 17/20* (2013.01); *H04N 13/111* (2018.05); *H04N 2213/008* (2013.01)

(58) Field of Classification Search
CPC .. H04N 13/254; H04N 13/279; H04N 13/344; H04N 13/111; H04N 2213/008; G06T 15/20; G06T 7/0004; G06T 11/001; G06T 2200/24; G06T 2207/30164; G06T 17/20; G09G 2354/00; G06F 3/048; G06F 3/0488; G06F 3/0481; G06F 3/013; G06F 3/1423; G06F 3/1454; G06F 3/1446; G06F 3/16
See application file for complete search history.

(56) References Cited

U.S. PATENT DOCUMENTS

| | | | |
|---|---|---|---|
| 11,076,125 | B2 | 7/2021 | Koike et al. |
| 11,366,631 | B2 | 6/2022 | Sakai et al. |
| 2011/0316853 | A1* | 12/2011 | Bar-Zeev ............... H04N 7/144 345/158 |
| 2012/0281059 | A1 | 11/2012 | Chou et al. |
| 2014/0098183 | A1* | 4/2014 | Smith .................. H04N 9/3185 348/E7.083 |
| 2018/0348531 | A1* | 12/2018 | Nakahara ........... G02B 27/0179 |
| 2020/0029028 | A1 | 1/2020 | Kim |
| 2021/0157541 | A1* | 5/2021 | Sakai .................... G06F 3/1454 |

FOREIGN PATENT DOCUMENTS

| | | |
|---|---|---|
| JP | 2000-165831 A | 6/2000 |
| JP | 2002-149581 A | 5/2002 |
| JP | 2006-287297 A | 10/2006 |
| JP | 2012-169948 A | 9/2012 |
| JP | 2015-184986 A | 10/2015 |
| JP | 2017-17522 A | 1/2017 |
| JP | 2017-78891 A | 4/2017 |
| JP | 2020-65229 A | 4/2020 |
| WO | 2018/182063 A1 | 10/2018 |
| WO | 2019/187747 A1 | 10/2019 |
| WO | 2019/230852 A1 | 12/2019 |

OTHER PUBLICATIONS

Aug. 17, 2022 International Preliminary Report on Patentability issued in International Patent Application No. PCT/JP2020/018345.
Dec. 4, 2023 Partial Supplementary Search Report issued in European Patent Application No. 20933086.9.
Kauff et al., "An Immersive 3D Video-Conferencing System using Shared Virtual Team User Environments", Proceedings of the 4th International Conference on Collaborative Virtual Environments, 2002, pp. 105-112.
Alexander Hornung, "Shape Representations for Image-based Applications", PhD thesis at the RWTH Aachen, Jan. 1, 2009, 179 pages.
Lei et al., "Multi-step View Synthesis with occlusion handling", Proc. VMV01, Nov. 2001, pp. 185-192.

* cited by examiner

COMMUNICATION TERMINAL DEVICE, COMMUNICATION METHOD, AND SOFTWARE PROGRAM

TECHNICAL FIELD

The present invention relates to a communication terminal device that realizes satisfactory conversations between users in remote locations.

BACKGROUND ART

As a means of remote communication, there are web conferencing using general-purpose personal computers and the like, video conferencing using dedicated equipment, and video calls available with smartphones and the like. In any of these cases, an image of the other party at a remote location is mainly captured from the front thereof and displayed on a planar screen, and a call is performed by voice. Therefore, it is difficult to have a feeling of actually having a face-to-face conversation in the same space. In response to this, various technologies have been proposed to improve the quality of communication by sharing a virtual space.

PTL 1 discloses a teleconference system in which a plurality of members share the same space. The teleconference system of PTL 1 is composed of a server device and a plurality of client devices. A client device includes a headset worn by a user and having an acceleration sensor and a display device, and a three-dimensional shape acquisition sensor including an infrared sensor, an imaging means, and a sound collecting means. The server device analyzes a user's motion using a depth signal transmitted from the client device, generates CG (computer graphics) based on the motion analysis, displays real object data, synthesizes an augmented reality space, and transmits information on the synthesized augmented reality space to the client device. The client device displays an image on the display device of the headset and outputs audio signals to a speaker on the basis of the augmented reality space information received from the server device. Further, PTL 1 also discloses pasting a face texture acquired in advance onto CG shape information.

PTL 2 discloses technology for sharing a virtual space by a plurality of users and matching, for each user, a position in the real space with a position in the virtual space. The virtual space sharing system disclosed in PTL 2 includes a means for detecting position information and visual field information at the location of each of a plurality of remote users, a user control means for transmitting the position information and visual field information and receiving virtual space information transmitted to each user, an information processing means for receiving the position information and visual field information of each user, disposing a virtual object representing each user at a position corresponding to the position information of each user in one virtual space shared by the plurality of users, generating virtual space information for displaying a corresponding virtual space from a viewpoint of each user according to the position information and visual field information of each user, and transmitting the virtual space information to each user, a display means for inputting the received virtual space information to each user control means for each user and displaying a virtual space seen from the viewpoint of each user.

PTL 3 discloses technology for reducing a communication load in a virtual reality space sharing system. The technology disclosed in PTL 3 is a virtual reality space sharing system in which a virtual reality space is shared between a first terminal used by a first user and a second terminal used by a second user, wherein an image generation device for generating a virtual reality space image to be displayed on the first terminal includes a line-of-sight information acquisition unit for acquiring line-of-sight information including a position and a line-of-sight direction of the second user in the virtual reality space from the second terminal, an image generation unit for generating a virtual reality space image to be displayed on the first terminal on the basis of the line-of-sight information from the second terminal, and an image supply unit for supplying the virtual reality space image generated by the image generation unit to the first terminal. Further, PTL 3 indicates that an object such as an avatar is displayed in place of the other user in a virtual reality space, and the orientation of the face of the object is matched with the orientation of the face of the other user.

CITATION LIST

Patent Literature

[PTL 1]
Japanese Patent Application Publication No. 2015-184996
[PTL 2]
Japanese Patent Application Publication No. 2002-149581
[PTL 3]
Japanese Patent Application Publication No. 2017-076891

SUMMARY OF INVENTION

Technical Problem

It is said that mutual actions, postures, facial expressions, complexion, lines of sight, and the like play an important role as non-verbal information transmission means in communication, building of trust in relationships, and the like, according to face-to-face communication between people. Transmission of such non-verbal information is also important in communication performed by sharing a virtual space.

However, in the technology of PTL 1, the other user appearing in a virtual space shared by a plurality of users is a CG image such as an avatar, or an image obtained by pasting a face texture obtained in advance onto the shape of the other user. In the technology of PTL 2, the other user appearing in a virtual space shared by a plurality of users is a virtual object. In the technology of PTL 3, the other user appearing in a virtual space shared by a plurality of users is an avatar. Therefore, it cannot be said that communication using the technologies of PTL 1 to 3 is sufficient for non-verbal information transmission.

In addition, in any of PTL 1 to 3, wearing a head-mounted display on the head is uncomfortable for the user and gives a sense of discomfort different from face-to-face conversation.

An object of the present invention is to provide technology for realizing satisfactory conversations between users in remote locations.

Solution to Problem

A communication terminal device according to one aspect of the present disclosure includes: an audio acquisition unit configured to acquire audio including a voice of an own user using an own device; a visual information acquisition unit configured to acquire visual information for enabling formation of three-dimensional data of a person in a predetermined user space; a person capture unit configured to identify a viewpoint position of the own user on the basis of visual information on the user space; an information transmission unit configured to transmit, to another device, image transmission information based on the visual information on the user space and audio transmission information based on the audio; an image display unit configured to display, on the basis of image transmission information transmitted from the other device, on a display surface having a fixed relative position relative to a shared virtual space, in which a first virtual space in which the user space is fixedly arranged and a second virtual space in which a user space of the other device is fixedly arranged are arranged at predetermined relative positions and relative angles, an image of the shared virtual space which can be viewed from the viewpoint position of the own user; and an audio output unit configured to output audio on the basis of audio transmission information transmitted from the other device.

Advantageous Effects of Invention

According to one aspect of the present disclosure, it is possible to provide a communication terminal device that realizes satisfactory conversations between users in remote locations.

DESCRIPTION OF EMBODIMENTS

Hereinafter, embodiments of the present invention will be described with reference to the drawings.

Figure 1:
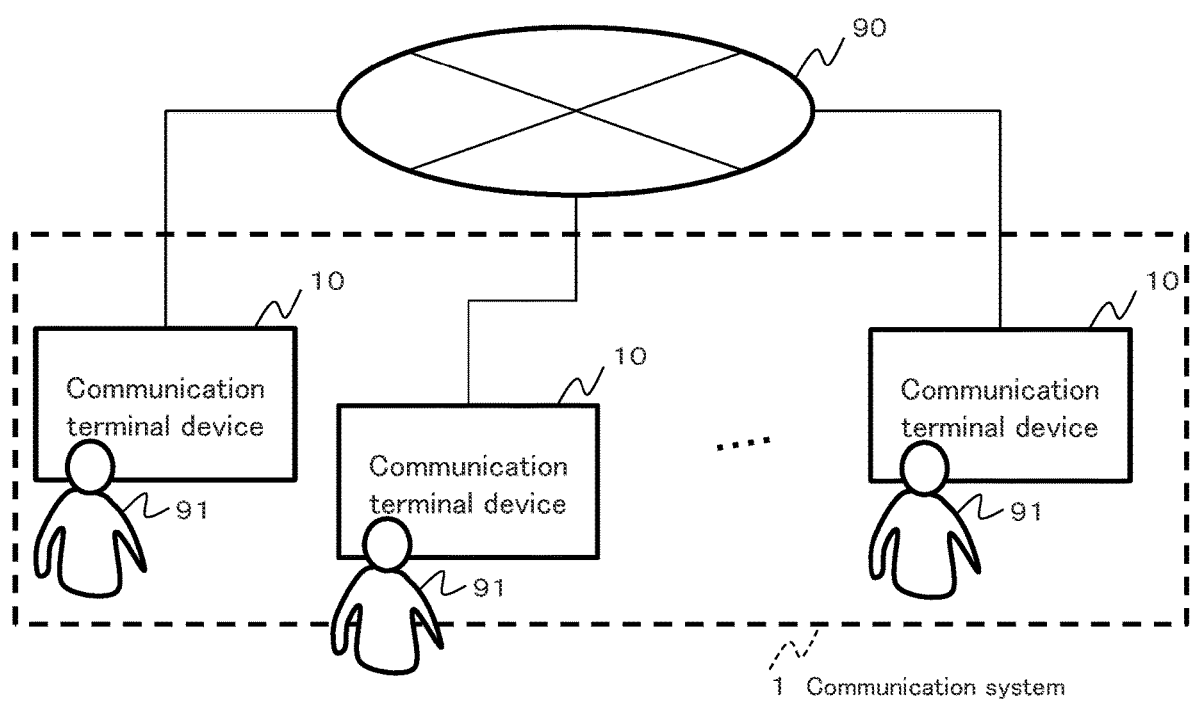
FIG. 1 is a block diagram of a communication system according to an embodiment.

FIG. 1 is a block diagram of a communication system according to the present embodiment. A communication system 1 includes a plurality of communication terminal devices 10. The communication system 1 is a system that reproduces an experience as if a plurality of remote users 91 were having face-to-face conversations in the same space. The plurality of communication terminal devices 10 basically have similar configurations and functions and can be interconnected via a communication network 90.

Here, focusing on a certain communication terminal device 10, this communication terminal device 10 may be referred to as an own device, a user 91 who uses the own device may be referred to as an own user, a communication terminal device 10 different from the own device may be referred to as another device, and a user 91 who use the other device may be referred to as another user. The number of other devices may be one or more, and may be plural.

Figure 2:
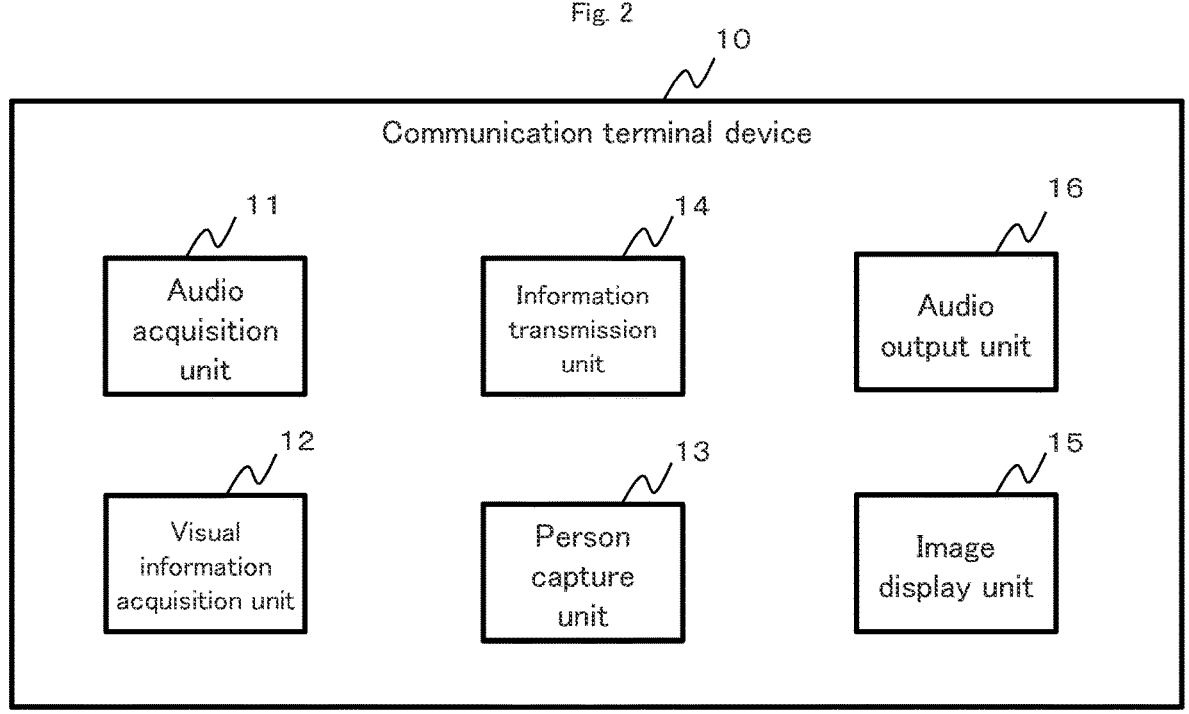
FIG. 2 is a block diagram of a communication terminal device according to an embodiment.

FIG. 2 is a block diagram of the communication terminal device according to the present embodiment. The communication terminal device 10 includes an audio acquisition unit 11, a visual information acquisition unit 12, a person capture unit 13, an information transmission unit 14, an image display unit 15, and an audio output unit 16.

In the present embodiment, it is assumed that a predetermined range in a real space where the user 91 using the communication terminal device 10 is likely to be present is defined as a user space, and the user 91 moves within the user space.

The audio acquisition unit 11 acquires audio including the voice of the user 91 in the user space. For example, the audio acquisition unit 11 includes a microphone which is not shown and acquires audio information through the microphone.

The visual information acquisition unit 12 acquires visual information that enables generation of three-dimensional data of objects in the user space. Three-dimensional data may be any data representing a three-dimensional object in a three-dimensional space, and a specific method is not particularly limited. Objects in the user space may include the user 91 using the communication terminal device 10. Visual information includes, for example, image information and depth information. Further, the visual information is acquired at a predetermined frame rate such as 30 to 60 fps (frames per second). The visual information acquisition unit 12 may include an image sensor (not shown) and a depth sensor (not shown), acquire an image in real time through the image sensor, and acquire a depth in real time through the depth sensor.

The person capture unit 13 identifies a viewpoint position of the user 91 on the basis of an image and/or a depth of the user space acquired by the visual information acquisition unit 12. Here, a viewpoint is a position where the eyeballs are located. A viewpoint position is a position in a three-dimensional space and can be represented by coordinates of a three-axis orthogonal coordinate system, for example. For example, the person capture unit 13 detects a person in the user space in real time on the basis of image and/or depth information, further identifies the head of the detected person, and sets the center of the head as the view/point position of the user 91. The viewpoint position may be the position of the viewpoint of the user 91 or a position that can be regarded as the viewpoint of the user 91, and is not limited to the example of the present embodiment. The center of a face region recognized by face recognition processing or person recognition processing, or a recognized center between the eyes may be set as the view/point position of the user 91.

The information transmission unit 14 transmits image transmission information based on the image and depth of the user space acquired by the visual information acquisition unit 12 and audio transmission information based on the audio acquired by the audio acquisition unit 11 to other devices.

The image transmission information is information that enables the image display unit 15 of another device to reproduce an image. The image transmission information may include, for example, the image and depth information acquired by the visual information acquisition unit 12, information obtained by compressing the information, information obtained by reducing a part thereof, or image and depth information of only feature points of a person. The feature points are feature points of the face and body of the user 91 and indicate, for example, the positions of the joints of the arms, the positions of the eyes, the position of the mouth, and the like. A posture, motion, and facial expression of a person can be reproduced from such feature point information.

The audio transmission information is information that enables audio output by the audio output unit 16 of another device. The audio transmission information may include, for example, audio information acquired by the audio acquisition unit 11, information obtained by compressing the audio information, information obtained by reducing a part of the audio information, or information obtained by processing the audio information.

The image display unit 15 forms a shared virtual space in which a first virtual space in which the user space of the own device is fixedly arranged and a second virtual space in which the user space of another device is fixedly arranged are arranged at predetermined relative positions, and displays an image of the shared virtual space viewed from the viewpoint position of the own user on a display surface having a relative position fixed with respect to the virtual space on the basis of image transmission information transmitted from the other device. A place where a physical entity that performs processing of generating an image to be displayed on the display surface of the other device on the basis of visual information acquired by the own device is present is not particularly limited. The processing may be performed by the own device, performed by another device, or performed by cloud computing between the own device and another device.

The viewpoint position of the own user is updated in real time by the person capture unit 13, and the image display unit 15 displays a video of the shared virtual space viewed from the real-time viewpoint position on the display surface using information on the viewpoint position of the own user updated in real time. As a result, a video having a motion parallax is displayed on the display surface.

The display surface on which an image is displayed is not particularly limited, and examples include a display surface on which an image of a display device is displayed, a display surface on which an image of a projector is projected, and the like. The display surface may be composed of one or more planes. If the display surface is rectangular and planar, the display surface can be represented by the position (for example, the position of the center), posture (for example, a roll angle, a pitch angle, and a yaw angle), and size (for example, vertical and horizontal lengths) of the display surface as a whole without having to be represented by a position in a three-dimensional space for each point included in the display surface. Further, the display surface may be composed of one or more curved surfaces. For example, if the display surface is a curved surface extending over a predetermined angular range in the circumferential direction of the inner surface of a cylinder, it is uniquely determined by the radius of the cross section of the cylinder, the height of the cylinder, and the angular range in which the curved surface spreads when viewed from the center of the circle. As another example, if the display surface is a curved surface extending over a predetermined angular range of the inner surface of a sphere, it is uniquely determined by the radius of the sphere and the angular range (a roll angle, a pitch angle, and a yaw angle) viewed from the center of the sphere. In general, a curved display surface can be represented by the positions of points included in the display surface in a three-dimensional space. Furthermore, the display surface may be composed of one or more curved surfaces and one or more planes.

As processing for making an image look plausible and natural in order to give the own user an illusion that another user exists in the shared virtual space in this manner, data of a three-dimensional object (hereinafter, three-dimensional data) in the shared virtual space is generated on the basis of image and depth information transmitted from another device, and at the time of generating an image to be displayed on the display surface, projection transformation (in other words, "perspective projection transformation", "perspective transformation" or "projective transformation") is performed such that the three-dimensional object in the shared virtual space defined by the three-dimensional data is projected onto the display surface, that is, a two-dimensional surface in the present embodiment. However, other processing methods that achieve similar effects may be used. Examples of other processing methods include a method of using a shared virtual space as a reference coordinate space and projecting each point of three-dimensional data in the reference coordinate space onto a point at which a straight line connecting each point and a viewpoint position intersects the display surface. Further, as another processing method for generating an image to be displayed on the display surface, a specific matrix or basic numerical arithmetic operation processing according to empirical rules may be performed on an image or three-dimensional parameters included in the image.

Figure 3:
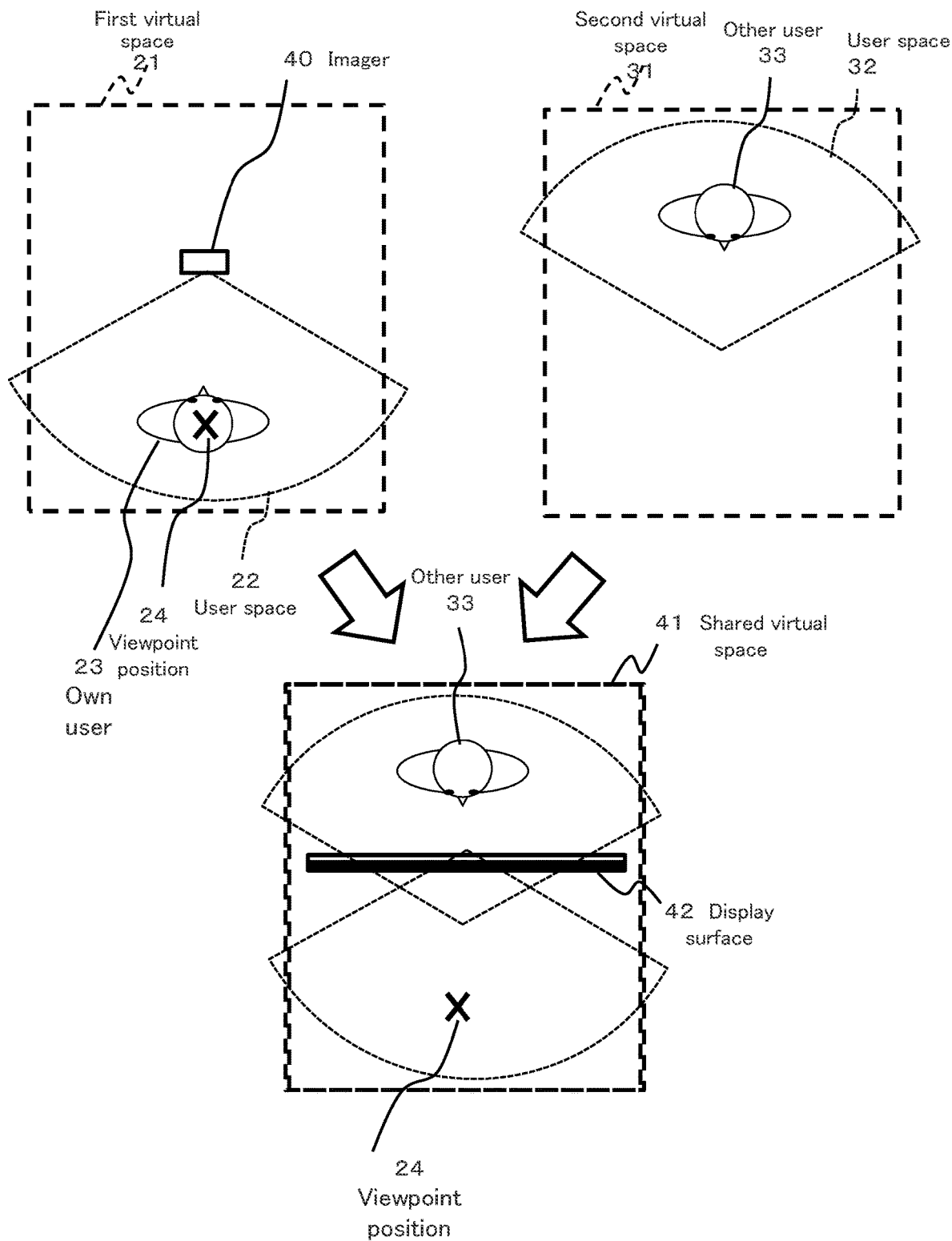
FIG. 3 is a conceptual diagram for describing processing of displaying an image.

FIG. 3 is a conceptual diagram for describing processing of displaying an image. FIG. 3 shows a plan view of a first virtual space 21, a second virtual space 31, and a shared virtual space 41 viewed from above. In FIG. 3, the space is represented as a plane for convenience of illustration, but it also extends in the height direction.

The image display unit 15 defines the first virtual space 21 in which a user space 22 of the own device is fixedly arranged. In the example of FIG. 3, the visual information acquisition unit 12 includes an imager 40 in which an image sensor for acquiring an image and a depth sensor for acquiring a depth are integrated, and the user space 22 is a space that spreads over the range of the angle of view of the imager 40. However, the size and shape of the user space 22 are not particularly limited. The size and shape of the first virtual space 21 are not particularly limited. The size of the first virtual space 21 may be infinite. A viewpoint position 24 of a own user 23 identified by the person capture unit 13 is present in the user space 22 of the own device.

In addition, the image display unit 15 defines a second virtual space 31 in which a user space 32 of another device is fixedly arranged. The size and shape of the second virtual space 31 are also not particularly limited. The size of the second virtual space 31 may be infinite. The example of FIG. 3 shows an example in which the second virtual space 31 and the first virtual space 21 have the same size and shape. However, they are not necessarily equal. Another user 33 is present in the user space 32 of the other device, an image and a depth of the other user 33 are acquired by the other device, and image transmission information based on information on the image and depth is transmitted to the own device.

The image display unit 15 defines a shared virtual space 41 in which the first virtual space 21 and the second virtual space 31 are arranged at predetermined relative positions. Here, the shared virtual space 41 is obtained by overlapping the first virtual space 21 and the second virtual space 31. The viewpoint position 24 of the own user 23 and the other user 33 are present in the shared virtual space 41.

Further, the image display unit 15 displays an image of the shared virtual space visible from the viewpoint position 24 of the own user 23 on a display surface 42 having a relative position fixed with respect to the shared virtual space 41 on the basis of the image transmission information transmitted from the other device.

Figure 4:
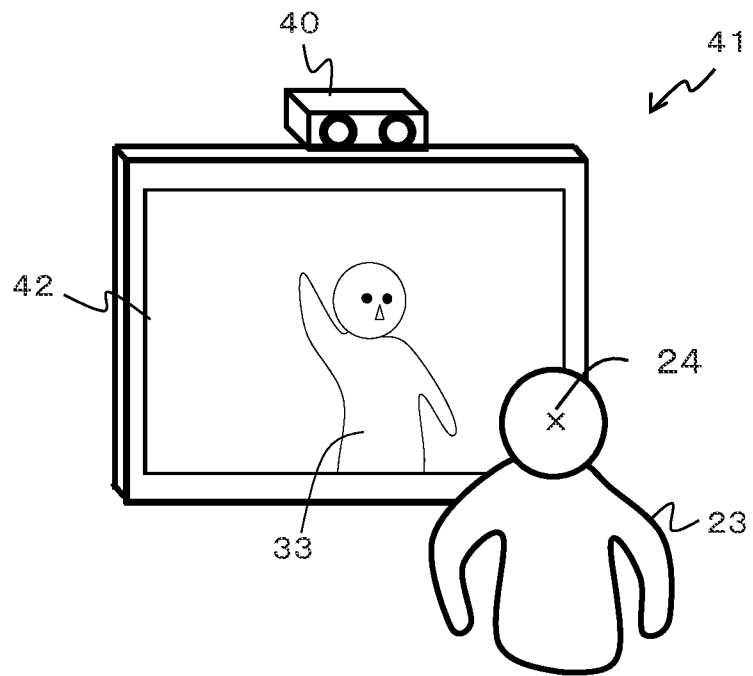
FIG. 4 is a diagram showing a state in which an image of a shared virtual space is displayed on a display surface.

FIG. 4 is a diagram showing a state in which an image of a shared virtual space is displayed on the display surface.

An image of the shared virtual space 41 viewed from the viewpoint position 24 of the own user 23 identified on the basis of the image and/or a depth acquired by the imager 40 is displayed on the display surface 42. The other user 33 appears to be present in front of the own user 23 from the viewpoint of the own user 23.

The image display unit 15 may configure virtual objects common to a plurality of communication terminal devices 10 as well as objects actually present in the user spaces of the communication terminal devices 10 connected to each other in the shared virtual space 41 and display an image thereof on the display surface. For example, when a user 91 of a certain communication terminal device 10 holds up a real object to the imager of the visual information acquisition unit 12, the visual information acquisition unit 12 may acquire three-dimensional data of the object, and a plurality of communication terminal devices 10 may allow the image display unit 15 to construct a virtual object based on the three-dimensional data in the shared virtual space 41.

The audio output unit 16 outputs audio on the basis of audio transmission information transmitted from the other device. The audio output unit 16 includes, for example, a speaker which is not shown, and outputs the audio through the speaker. At that time, the audio output unit 16 may reproduce the audio based on the audio transmission information transmitted from the other device as audio heard in a direction in which a user position of the other user is disposed in the shared virtual space 41 using a stereo method, a surround method, a three-dimensional sound method, or the like. A plurality of people in remote locations can communicate with each other in a virtual space using real images and stereophonic sound.

Figure 5:
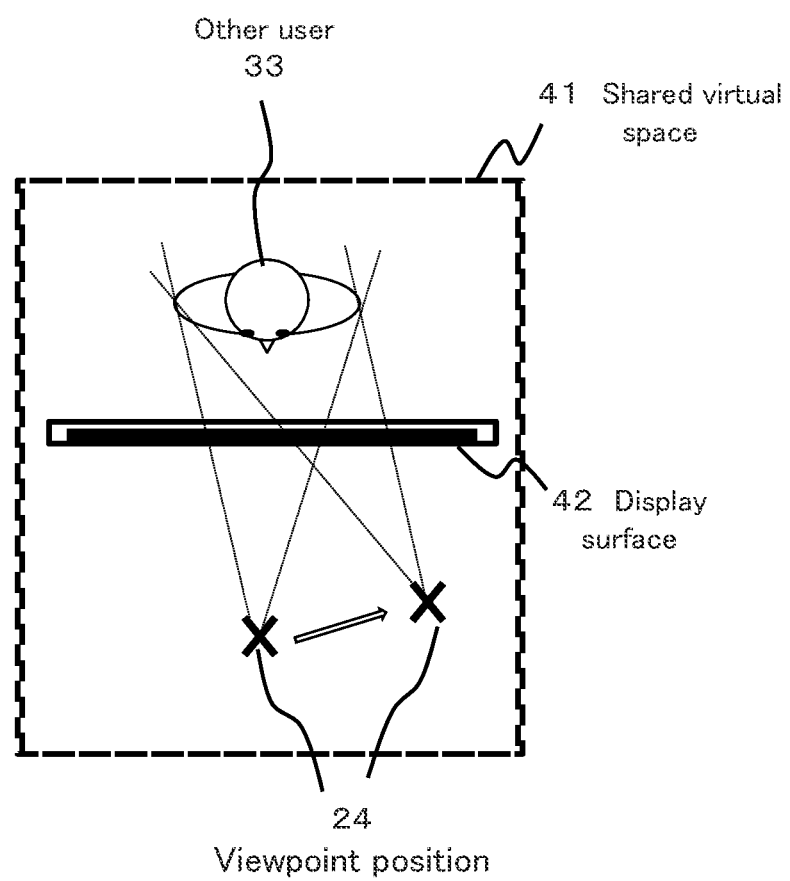
FIG. 5 is a diagram showing a state of change in an image displayed on the display surface.

FIG. 5 is a diagram showing a state of change in an image displayed on the display surface.

As described above, the person capture unit 13 identifies the viewpoint position 24 of the own user 23, and the image display unit 15 displays an image of the shared virtual space viewed from the viewpoint position 24 of the own user 23 on the display surface 42 on the basis of the image transmission information transmitted from the other device. Therefore, as shown in FIG. 5, even if the other user 33 does not move, the image displayed on the display surface 42 changes due to motion parallax if the viewpoint position 24 of the own user 23 changes. For example, if the own user 23 shifts the viewpoint position 24 from the front to the right, it is also possible to look into the oblique left profile of the other user 33.

As described above, according to the present embodiment, the communication terminal device 10 shares a virtual space with other communication terminal devices 10 and displays actual figures of other users 33 sharing the virtual space on the display surface 42 having a relative position fixed in the virtual space such that the actual figures are viewed from the viewpoint position 24 of the own user 23, and thus satisfactory communication performed while viewing each other's real image in the virtual space shared by a plurality of people in remote locations is realized.

Processing executed by the audio acquisition unit 11, the visual information acquisition unit 12, the information transmission unit 14, the person capture unit 13, the audio output unit 16, and the image display unit 15 shown in FIG. 2 may be defined by a software program, and a computer having a memory and a processor may execute the software program.

More specific embodiments will be described below.

Embodiment 1

Embodiment 1 illustrates a teleconference system that simulates a face-to-face conference among a plurality of users in the same conference room. The teleconference system of embodiment 1 has the same basic configuration as the communication system 1 according to the embodiment shown in FIG. 1 to FIG. 4.

Figure 6:
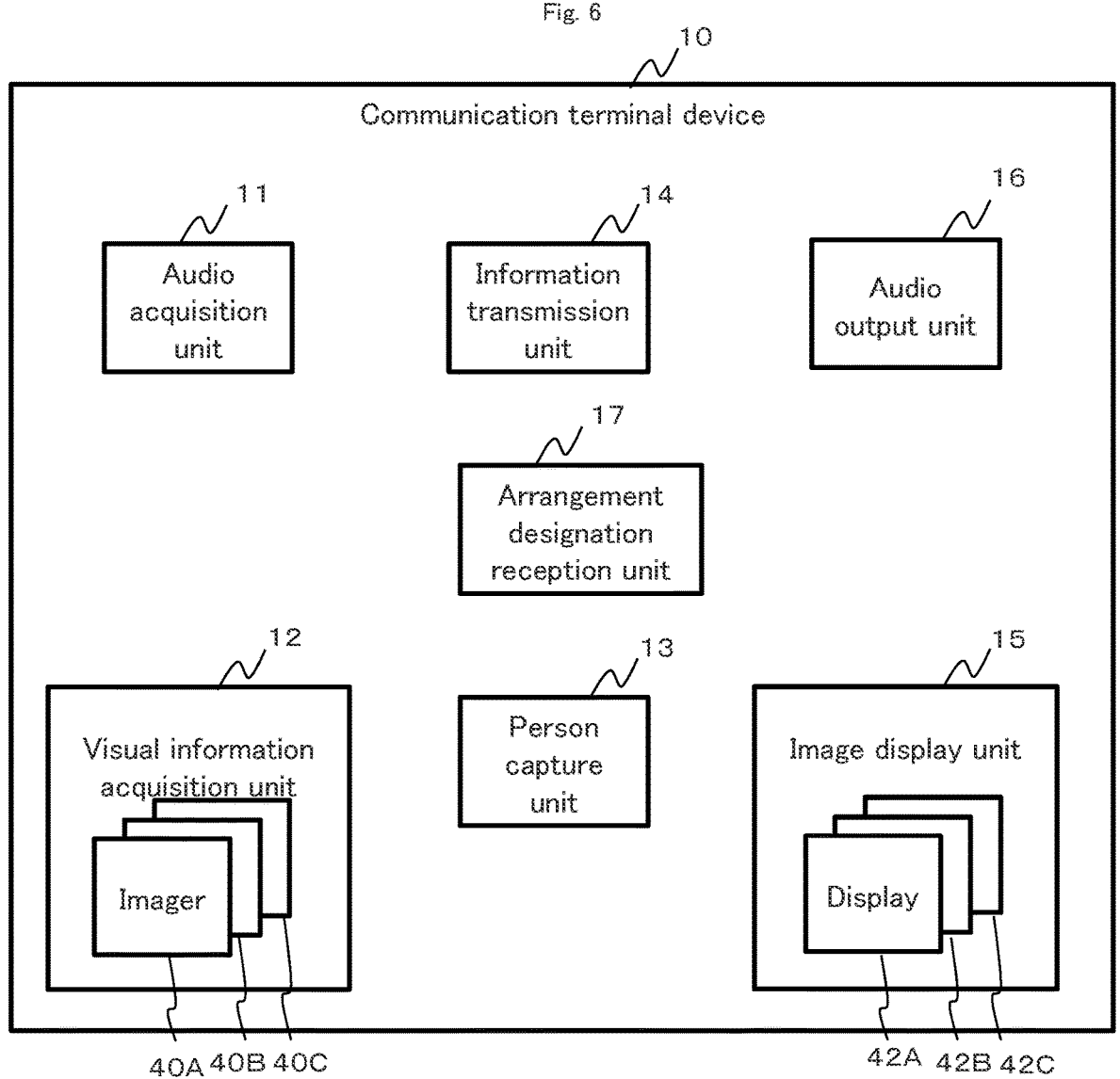
FIG. 6 is a block diagram of a communication terminal device according to embodiment 1.

FIG. 6 is a block diagram of a communication terminal device according to embodiment 1. The communication terminal device 10 according to the present embodiment includes the audio acquisition unit 11, the visual information acquisition unit 12, the person capture unit 13, the information transmission unit 14, the image display unit 15, the audio output unit 16, and an arrangement designation reception unit 17. The audio acquisition unit 11, the visual information acquisition unit 12, the person capture unit 13, the information transmission unit 14, the image display unit 15, and the audio output unit 16 are basically the same as those in the embodiment shown in FIG. 2. The arrangement designation reception unit 17 receives designation from the user 91 regarding an arrangement of the user space 22 of the own device and the user spaces 32 of the other devices with respect to the shared virtual space 41 and shares the arrangement with the other devices. In the present embodiment, the visual information acquisition unit 12 includes three imagers 40A, 40B, and 40C, and the image display unit 15 includes three displays 42A, 42B, and 42C. In the present embodiment, the visual information acquisition unit 12 and the image display unit 15 perform operations which will be described below on the basis of the arrangement received by the arrangement designation reception unit 17.

Figure 7:
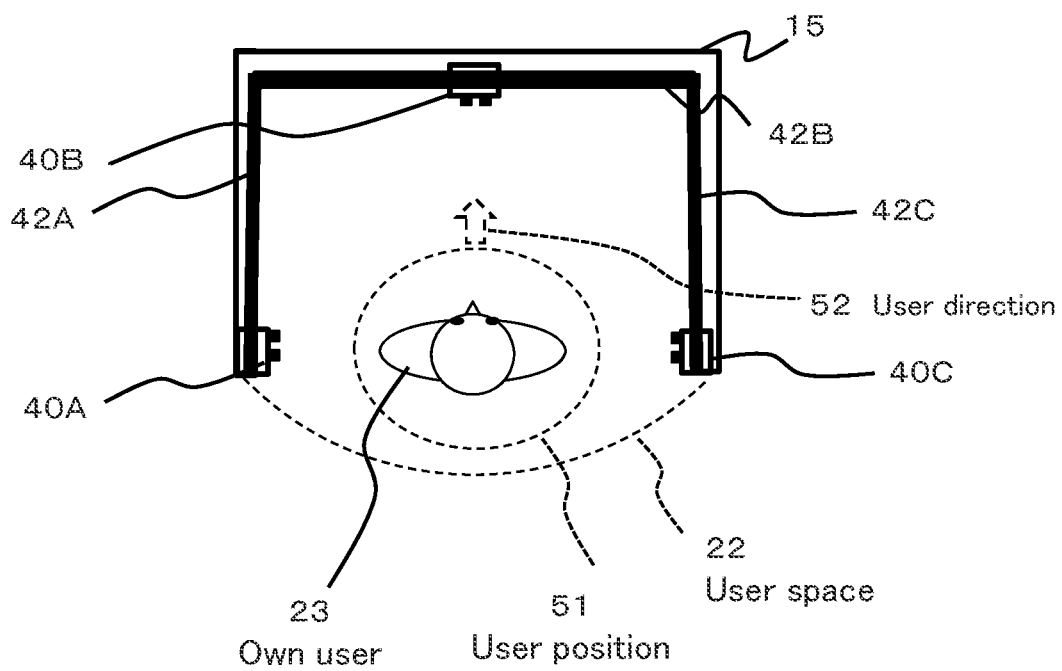
FIG. 7 is a schematic plan view of the communication terminal device according to embodiment 1.
Figure 8:
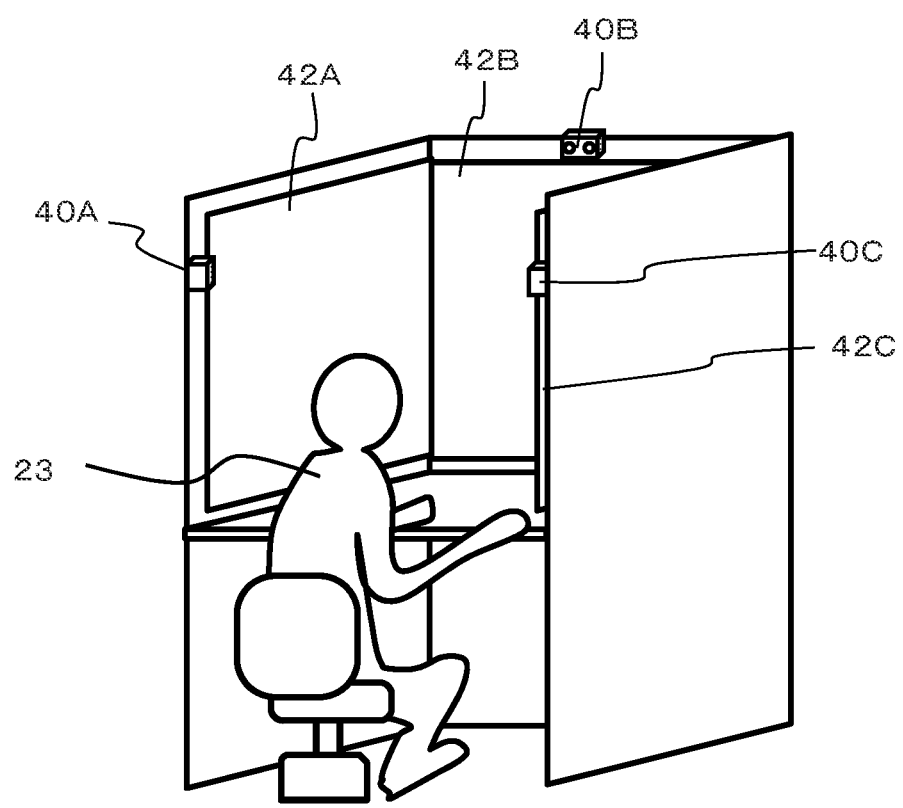
FIG. 8 is a schematic perspective view of the communication terminal device of embodiment 1.

FIG. 7 is a schematic plan view of the communication terminal device according to embodiment 1. FIG. 8 is a schematic perspective view of the communication terminal device of embodiment 1.

As shown in FIG. 7, a predetermined position in the user space 22 is defined as a user position 51 and a predetermined direction from the user position 51 is defined as a user direction 52 in embodiment 1. For example, the user position 51 is a position at which the user 91 using the communication terminal device 10 is likely to be mainly present. For example, the user direction 52 is a direction in which the user 91 using the communication terminal device 10 is likely to mainly face.

As shown in FIG. 8, each of the displays 42A to 42C is a display device having a rectangular and planar display surface which is arranged facing the user position 51. The display 42B is arranged in the user direction 52 when viewed from the user position 51. The display 42C is arranged on the right side of the user direction 52 when viewed from the user position 51. The display 42A is arranged on the left side of the user direction 52 when viewed from the user position 51. All of the displays 42A to 42C are arranged with their display surfaces facing the user position 51. Although it is desirable that the display 42C have an angle of 90° or more and less than 180° between the display surfaces of the display 42C and the display 42B, 90° in the present embodiment, and is close to the right edge of the display 42B, it may be arranged at an angle less than 90° as long as the user can use this device comfortably. Although it is desirable that the display 42A have an angle of 90° or more and less than 180° between the display surfaces of the display 42A and the display 42B, 90° in the present embodiment, and is close to the left edge of the display 42B, it may be arranged at an angle less than 90° as long as the user can use this device comfortably. Further, although an example in which the displays 42A to 42C are all set at 90° with respect to the horizontal plane is illustrated, they may be set at an angle between 0° and 180° with respect to the horizontal plane.

The imagers 40A to 40C have fixed relative positions with respect to the user position 51 and fixed relative directions with respect to the user direction 52, and they are separated from each other and arranged with imaging directions toward the user position 51 such that at least a part of the user space 22 is imaged. Desirably, the imager 40B is arranged near the center of the upper edge of the display surface of the display 42B. The imager 40A is arranged on the upper edge of the display surface of the display 42A or on the left edge of the display surface of the display 42A. The imager 40C is arranged on the upper edge of the display surface of the display 42C or on the right edge of the display surface of the display 42C. In the present embodiment, as shown in FIG. 8, the imager 40A is arranged on the left edge of the display surface of the display 42A and the imager 40C is arranged on the right edge of the display surface of the display 42C.

Figure 9:
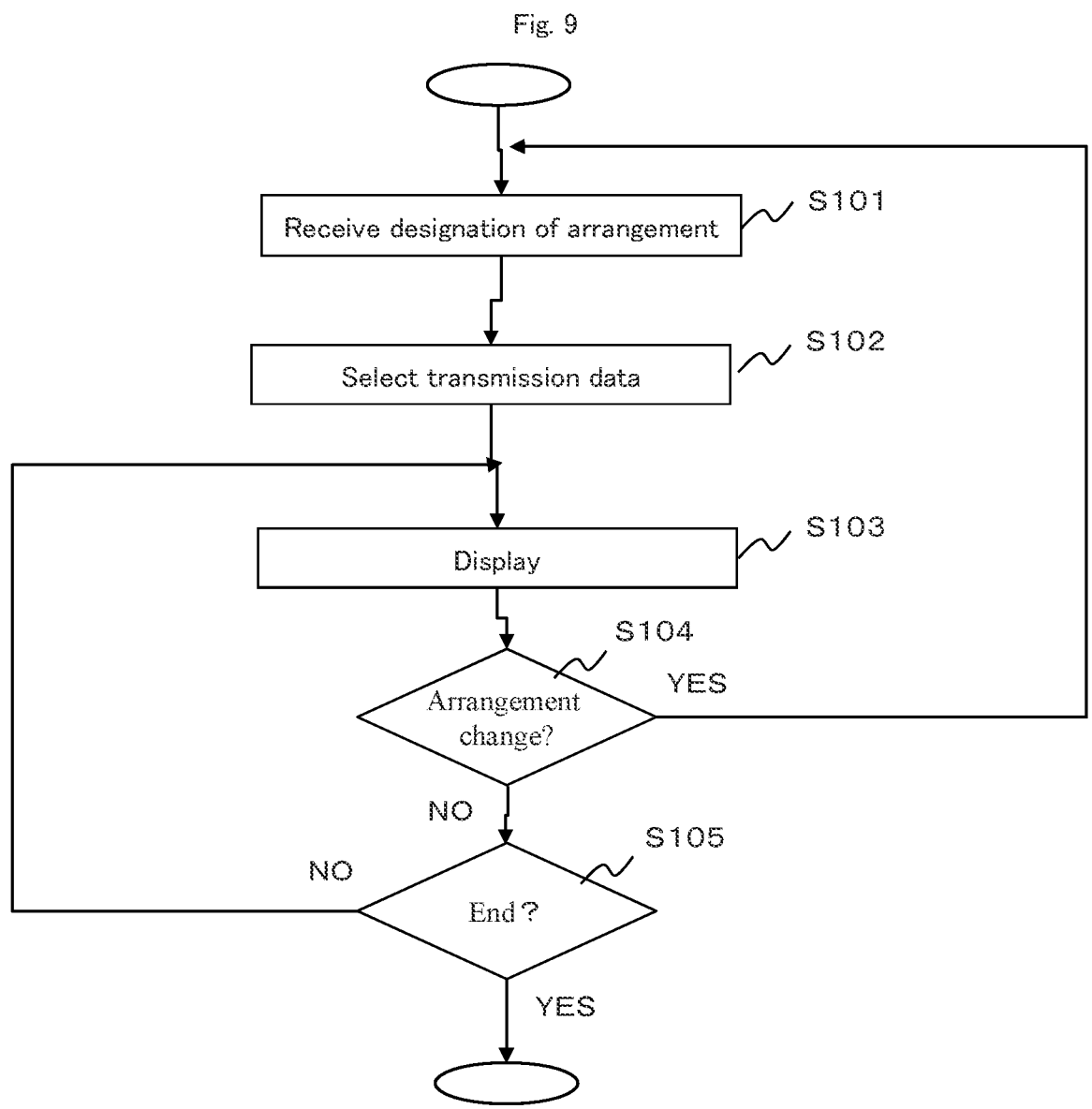
FIG. 9 is a flowchart of image display processing in embodiment 1.

FIG. 9 is a flowchart of image display processing in embodiment 1. Image display processing is processing for realizing teleconferencing through mutual communication between the own device and other devices and is mainly executed by the information transmission unit 14, the image display unit 15, and the arrangement designation reception unit 17.

First, the arrangement designation reception unit 17 receives designation of an arrangement of the own device and other devices in the shared virtual space 41 in step S101. Since the user space 22 and the user position 51 are fixedly defined with respect to the displays 42A to 42C and the imagers 40A to 40C of the own device and user spaces 32 and user positions of the other devices are fixedly defined with respect to the displays 42A to 42C and the imagers 40A to 40C of the other devices, it is possible to decide arrangement of the user spaces 22 and 32, the user position 51, and the user positions of the other devices with respect to the shared virtual space 41 by receiving the arrangement of the own device and the other devices with respect to the shared virtual space 41.

At this time, the arrangement designation reception unit 17 may display, on the display surface of the display 42B, an arrangement designation screen, for example, according to a plan view of a shared space in which an object corresponding to the own device and objects corresponding to the other devices can be movably arranged, viewed from above, and receive designation of the arrangement of the user spaces 22 and 32 with respect to the shared virtual space 41 on the basis of positions of the objects designated with respect to the plan view.

Figure 10:
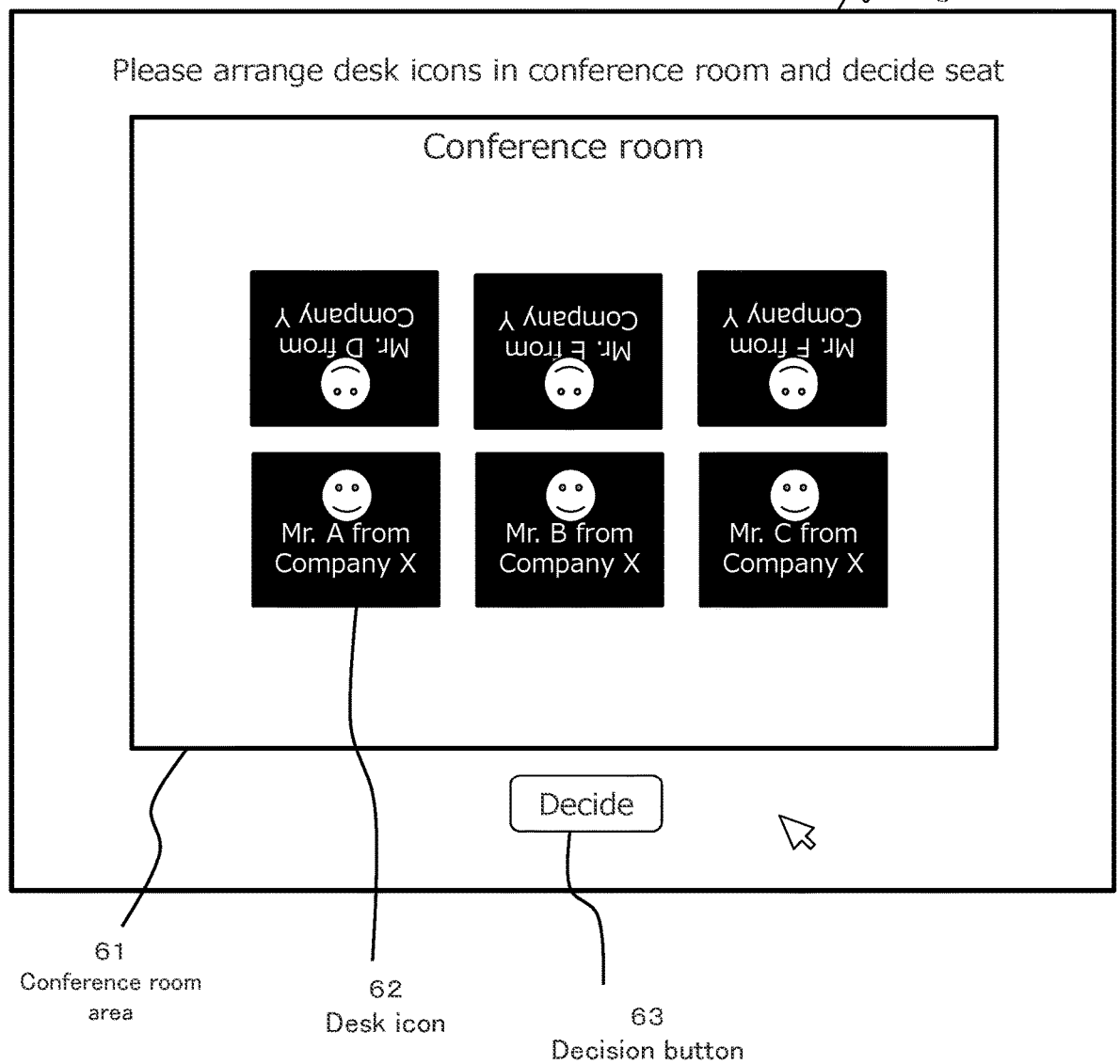
FIG. 10 is a diagram showing an example of an arrangement designation screen in embodiment 1.

FIG. 10 is a diagram showing an example of an arrangement designation screen according to embodiment 1. The arrangement designation screen 60 includes a conference room area 61 and a decision button 63. The conference room area 61 is a plan view imitating the shared virtual space 41 corresponding to a virtual conference room. A desk icon 62 that is an object corresponding to the communication terminal device 10 used by each member participating in a conference is arranged in the conference room area 61. The desk icon 62 can be moved or fixed by, for example, a mouse operation, a touch operation performed on the display 42B, or a gesture operation which will be described later. The shape and size of the conference room area 61 may be changeable. Here, as an example, the conference room area 61 imitates the shared virtual space 41, and thus the shape and size of the shared virtual space 41 may be determined according to the shape and size of the conference room area 61. When the decision button 63 is pressed, an arrangement of the user spaces 22 and 32 and the user position 51 of each communication terminal device 10, and user positions of the other devices in the shared virtual space 41 is determined on the basis of an arrangement of the desk icons 62 with respect to the conference room area 61 at that time.

There is a situation of a conference in which a plurality of people meet. There is a typical form of a conference in which a plurality of people face a plurality of people in negotiations and the like. Although various arrangements such as one-to-one and one-to-raany are possible, the example in FIG. 10 illustrates an arrangement in which six users face each other in a three-to-three arrangement. Here, although Mr. A, Mr. B, and Mr. C who belong to Company X and Mr. D, Mr. E, and Mr. F who belong to Company Y are arranged facing each other, it is an example.

In addition, here, an example in which the user 91 freely moves the desk icons 62 to designate an arrangement through the arrangement designation reception unit 17 is illustrated, but other examples are also possible. For example, the arrangement designation reception unit 17 may assist in designation of an arrangement or the arrangement designation reception unit 17 may automatically set or propose an arrangement.

When the arrangement designation reception unit 17 assists in designation of an arrangement, a plurality of typical arrangement patterns may be prepared in advance and the user 91 may be allowed to select one thereof. For example, when the number of users who will initially participate in a conference is input, the arrangement designation reception unit 17 may present patterns corresponding to the number of users to allow the user to select one thereof.

In addition, when the arrangement designation reception unit 17 automatically sets or proposes an arrangement, for example, if this conference is a place for making some kinds of presentation, a main presenter may be arranged at a position (positions of Mr. B of Company X and Mr. E of Company Y in the example of FIG. 10) that can be easily viewed by all conference participants. Further, the main presenter may be identified depending on the amount of speaking at the conference, and arrangement may be set.

In the present embodiment, it is possible to realize that the user positions 51 of a plurality of communication terminal devices 10 are arranged on each of two straight lines parallel to each other, and the user directions 52 of the communication terminal devices 10 on each straight line are perpendicular to the other straight line. Here, arrangement of the user positions 51 on a straight line does not imply strict positioning, and orientation of the user directions 52 perpendicular to the straight line does not imply strict orientation. In both cases, it is enough to simulate a state in which the users of the plurality of communication terminal devices 10 have their desks arranged side by side in a conference.

In step S102, the information transmission unit 14 selects an imager such that an image of a part that can be viewed when an object within a predetermined range (for example, user space) of the user position of the own device is viewed from a predetermined range (for example, user space) of user positions of the other devices is acquired on the basis of relative angles between the imaging directions of the imagers 40A to 40C of the own device in the shared virtual space and straight lines connecting the user positions of the other devices and the user position of the own device, and transmits image transmission information including image and depth information acquired by the selected imager to the other devices.

When the user position of another device is arranged on the right side of the user direction 52 from the user position 51 of the own device in the shared virtual space 41, the information transmission unit 14 may transmit, to the other device, image transmission information that includes information according to the imager 40C on the right side and does not include information according to the imager 40A on the left side. In addition, when the user position of another device is arranged on the left side of the user direction 52 from the user position 51 of the own device in the shared virtual space 41, the information transmission unit 14 may transmit, to the other device, image transmission information that includes information according to the imager 40A on the left side and does not include information according to the imager 40C on the right side.

For example, focusing on a combination in which the own user 23 is Mr. A of Company X and the other user 33 is Mr. F of Company Y, an image of Mr. A of Company X within a range visible from a viewpoint position of Mr. F of Company Y can be generated in the other device even if there is no image and depth data of Mr. A of Company X acquired by the imager 40A on the left side of the own device. Therefore, the information transmission unit 14 of the own device used by Mr. A of Company X transmits image transmission information based on image and depth data acquired by the imagers 14B and 14C to the other device used by Mr. F of Company Y. Further, focusing on a combination in which the own user 23 is Mr. A of Company X and the other user 33 is Mr. B of Company X, an image of Mr. A of Company X within a range visible from a viewpoint position of Mr. B of Company X can be generated in the other device even if there is no image and depth data of Mr. A of Company X acquired by the imager 40A on the left side of the own device. The information transmission unit 14 of the own device used by Mr. A of Company X transmits image transmission information based on image and depth data acquired by the imagers 14B and 14C to the other device used by Mr. B of Company X.

Here, processing of the information transmission unit 14 selecting an imager from the plurality of imagers 40A to 40C on the basis of relative angles between the imaging directions of the imagers and a straight line connecting a user position of another device and the user position of the own device is illustrated, but other examples are also possible. For example, the information transmission unit 14 may select an imager from the plurality of imagers 40A to 40C on the basis of the position, angle, and size of the display surfaces of the other device in addition to the relative angles between the imaging directions of the imagers and the straight line connecting the user position of the other device and the user position of the own device. In such a case, the information transmission unit 14 may select an imager such that an image of a part visible when an object within a predetermined range (for example, user space) of the user position of the own device is viewed from a predetermined range (for example, user space) of the user position of the other device via the display surface of the other device is acquired. Here, an example in which the information transmission unit 14 of the own user selects image transmission information to be transmitted to the communication network 90 in advance and then transmits the image transmission information is shown, but the method is not limited thereto. A method in which the information transmission unit 14 transmits image transmission information obtained from all imagers to a server on the communication network 90 once, and then the server performs processing of selecting image transmission information and transmits the selected image transmission information to the other user may be adopted. Further, selection of transmission data in step S102 is not necessarily performed, and this step may be skipped in an environment in which a sufficient data communication band can be secured and reduction of the amount of data on the network is unnecessary.

Next, in step S103, the image display unit 15 displays an image of the shared virtual space 41 viewed from the viewpoint position 24 of the own user 23 on the display surfaces of the displays 42A, 42B, and 42C on the basis of the image transmission information transmitted from the other devices. Since the user spaces 22 and 32 of the respective users are fixedly arranged in the shared virtual space 41, the other users at positions in accordance with the arrangement can be viewed from the viewpoint position 24 of the own user 23.

Figure 11:
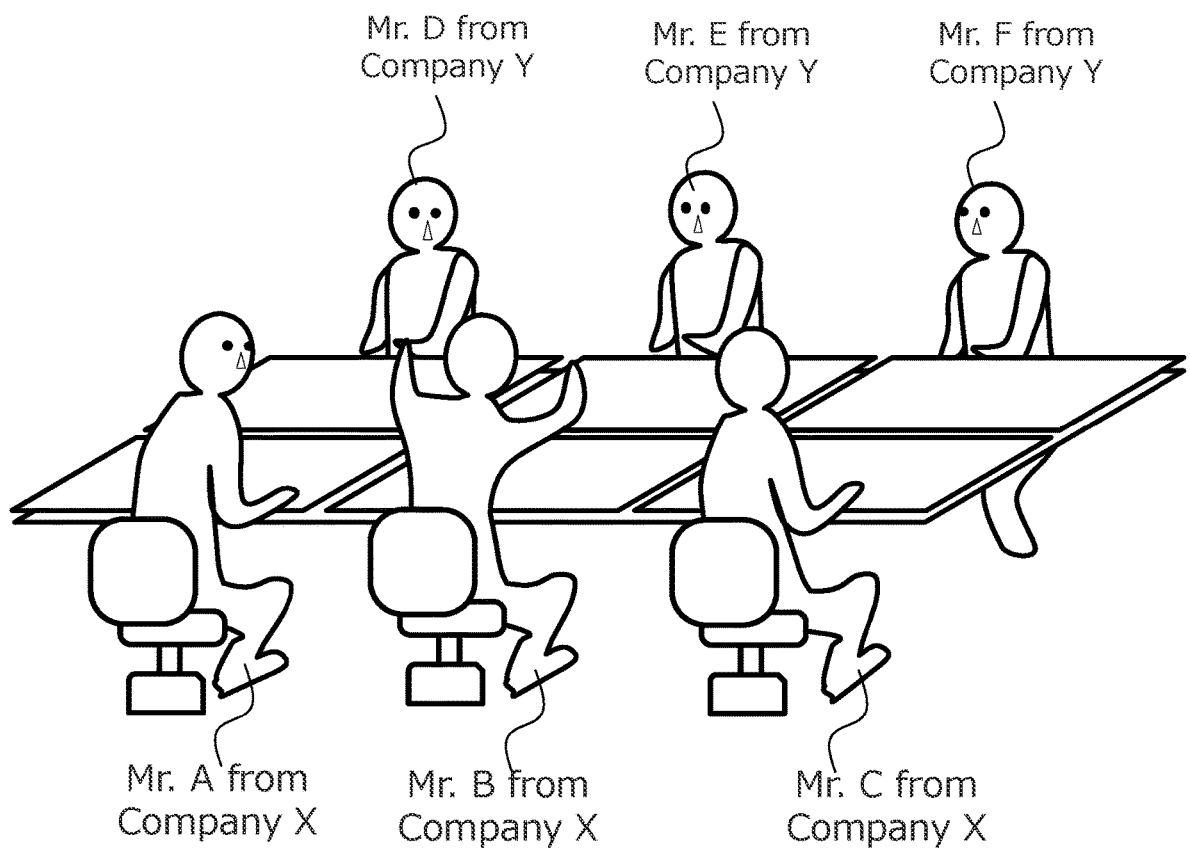
FIG. 11 is a conceptual diagram showing a state of teleconferencing in which a face-to-face conference performed by a plurality of users in the same conference room is simulated.

FIG. 11 is a conceptual diagram showing a state of teleconferencing in which a face-to-face conference performed by a plural icy of users in the same conference room is simulated. FIG. 11 shows an example in which the arrangement shown in FIG. 10 is simulated. The image display unit 15 may arrange the user positions 51 of the own device and at least one of other devices on a first straight line and a second straight line parallel to each other, and form a shared virtual space such that the user direction 52 of the device having the user position arranged on the first straight line is set to a direction facing the second straight line and perpendicular to the first straight line, and the user direction 52 of the device having the user position 51 arranged on the second straight line is set to a direction facing the first straight line and perpendicular to the second straight line.

On the front side of FIG. 11, Mr. A, Mr. B, and Mr. C of Company X are lined up side by side on a straight line and facing the back. On the back side, Mr. D, Mr. E, and Mr. F of Company Y are lined up side by side on a straight line and facing the front. Mr. A, Mr. B, Mr. C, Mr. D, Mr. E, and Mr. F actually use the communication terminal devices 10 at different places. Images of the shared virtual space 41 viewed from viewpoint positions of the respective users in the arrangement shown in FIG. 11 are displayed on the displays 42A to 42C of the communication terminal devices 10 of the respective users. Accordingly, all users can obtain visual fields from respective seats when the six people are having a conference with desks arranged in the arrangement as shown in FIG. 11 in the conference room.

Next, in step S104, the arrangement designation reception unit 17 determines whether or not there is a request for changing the arrangement of the own device and other devices in the shared virtual space 41. If there is a request for changing the arrangement, the arrangement designation reception unit 17 returns to step S101 and receives designation of arrangement.

The own user or other users can change the shape and size of the shared virtual, space 41 corresponding to the conference room and the arrangement of the user space corresponding to the arrangement of each user with respect to the shared virtual space 41 in the conference room according to an operation performed on the arrangement designation screen 60 illustrated in FIG. 10.

Figure 12:
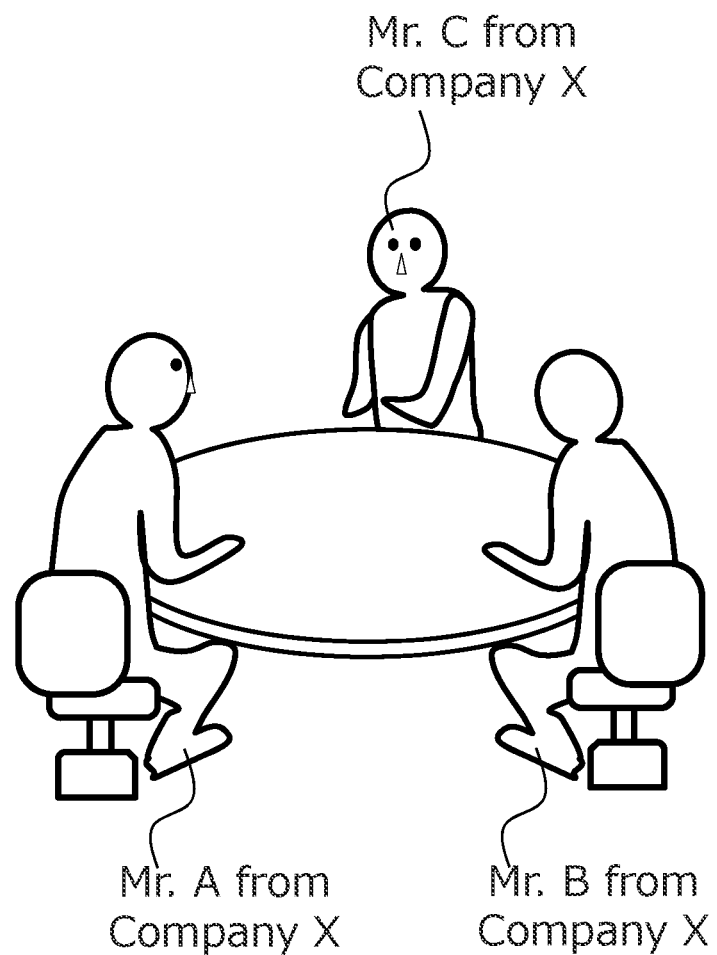
FIG. 12 is a conceptual diagram showing a state of teleconferencing according to another configuration.

FIG. 12 is a conceptual diagram showing a state of teleconferencing according to another configuration. In the example of FIG. 12, Mr. A, Mr. B, and Mr. C of Company X, who actually use the communication terminal devices 10 in different places, are facing each other in the shared virtual space 41 surrounding a round table. The image display unit 15 may arrange the user positions 51 of the own device and the other devices in a predetermined circular or polygonal form and form the shared virtual space 41 such that user directions of the own device and the other devices face the center of the circle or polygon.

Figure 13:
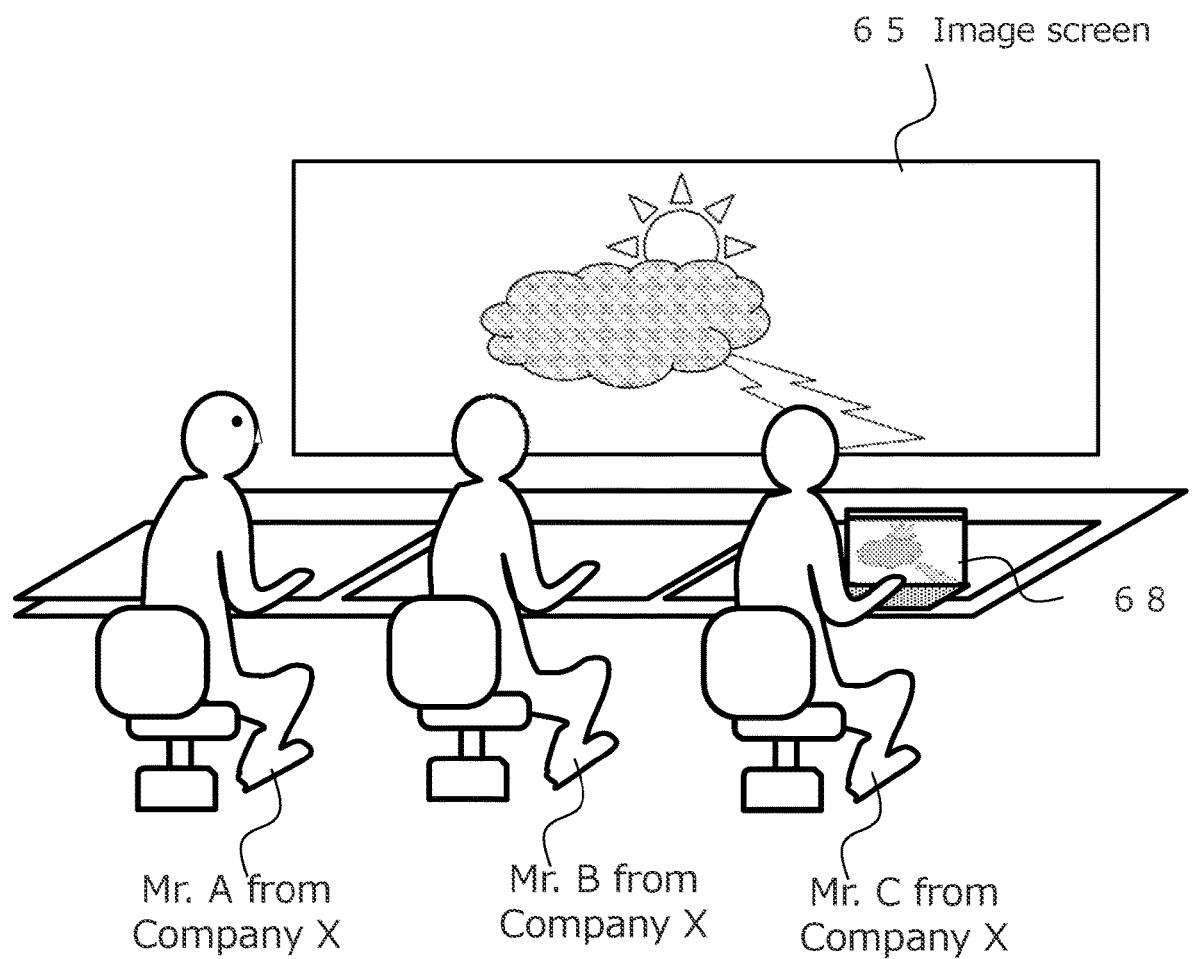
FIG. 13 is a conceptual diagram showing a state of teleconferencing according to yet another configuration.

FIG. 13 is a conceptual diagram showing a state of teleconferencing according to further another configuration. In the example of FIG. 13, Mr. A, Mr. B, and Mr. C of Company X, who actually use the communication terminal devices 10 in different places, line up side by side in the shared virtual space 41 and face an image screen 65 through which images can be shared. The image display unit 15 may arrange the user positions 51 of the own device and the other devices on a predetermined straight line and form the shared virtual space 41 such that the user directions of the own device and the other devices are set to the same direction perpendicular to the straight line. A plurality of users can line up side by side and view a video projected on a huge screen in a virtual space together. For example, it is a video on a personal computer connected to the communication terminal device 10, a video obtained by real-time streaming reproduction of a video acquired at a photographing site, or the like. In addition, the shared virtual space may be defined as a sphere that is large enough to include all the users and a 360° video that is being streamed or has been captured may be pasted inside the sphere, such that the users can view the video together while sharing the entire space. The image screen 65 of FIG. 13 displays, on the display surface, an image of a virtual object configured in the shared virtual space 41 and shared by the plurality of communication terminal devices 10. In the example of FIG. 13, an image displayed on a personal computer 68 of Mr. C is displayed on the image screen 65.

If there is no request for changing the arrangement in step S104, the image display unit 15 determines whether or not there is a request for ending teleconferencing in step S105. If there is no request for ending teleconferencing, the image display unit 15 returns to step S103. If there is a request for ending teleconferencing, the communication terminal device 10 ends teleconferencing.

According to the present embodiment, since virtual spaces of the own device and other devices are superimposed and shared, and real figures of other users in the virtual space are displayed on a display surface having a relative position fixed in the virtual space such that the real figures can be viewed from the viewpoint position of the own user, it is possible to realize satisfactory communication while viewing real images of a plurality of people in a virtual space shared by the plurality of people in remote locations.

Further, according to the present embodiment, since image transmission information based on visual information acquired by only an imager selected from the three imagers 40A to 40C on the basis of relative angles between the imaging directions and a straight line connecting a user position of another device and the user position 51 of the own device can be transmitted to the other device, image transmission information transmitted from the own device to the other device is reduced and thus the amount of data on a network can also be reduced.

Further, according to the present embodiment, as shown in FIG. 7 and FIG. 8, the display surface is arranged to surround the user position 51, and thus a configuration for displaying the shared virtual space 41 in a wide angle range can be realized with a small occupied space.

Further, according to the present embodiment, it is possible to easily set a positional relationship between the own device and other devices with a feeling of moving desks in a conference room in a plan view on a screen.

Figure 14:
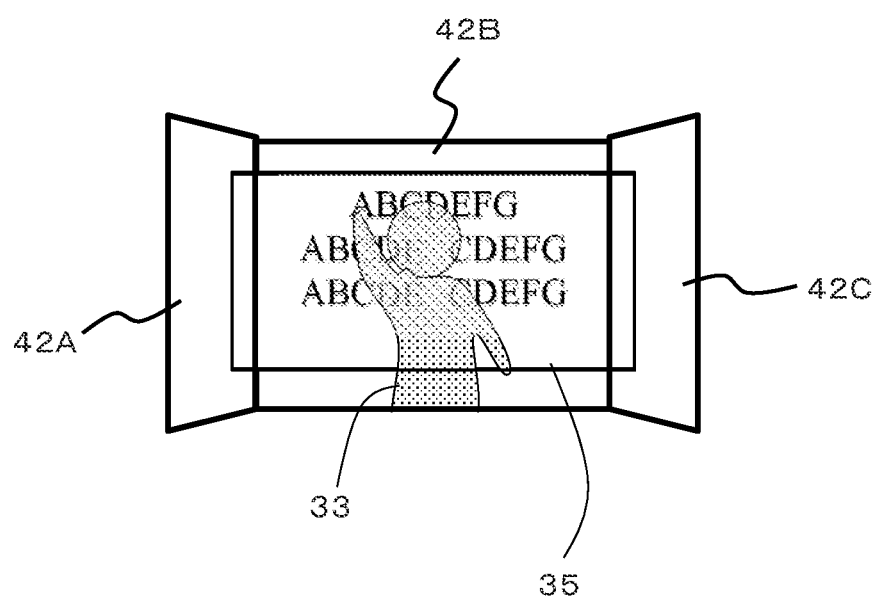
FIG. 14 is a conceptual diagram showing a state in which a screen obtained by processing a point group is displayed on a display surface.

Further, in the present embodiment, the image display unit 15 may generate three-dimensional data of the shared virtual space 41 representing an object in a second virtual space as a point group or a polygon mesh on the basis of image and depth information transmitted from another device and display an image of the shared virtual space 41 viewed from the viewpoint position 24 of the own user 23 on the display surface on the basis of the generated three-dimensional data. At that time, the image display unit 15 may be able to process points of the point group. For example, the image display unit 15 may translucently display a three-dimensional object located in front of the own user in the three-dimensional data and cause a three-dimensional object located behind to be visible by reducing a display size of points representing the three-dimensional object. By processing a person displayed by the point group to be translucent, it is possible to transmit information behind the person while leaving non-verbal information according to the face or body of the person. For example, by making a writing hand translucent such that characters hidden by the hand can be viewed during writing, it is possible to simultaneously convey non-verbal information according to hand motions and information on written characters. In addition, by making a person who is writing characters translucent such that characters hidden behind the figure of the person can be viewed during writing, for example, it is possible to simultaneously convey non-verbal information according to motions of the person and information on the written characters. FIG. 14 is a conceptual diagram showing a state in which a screen obtained by processing a point group is displayed on a display surface. FIG. 14 shows a state in which characters on a whiteboard 35 in a virtual space behind another user 33 translucently displayed by processing a point group are viewed on the display surfaces of the displays 42A, 42B, and 42C. Here, although processing of changing the display size of points of a point group is exemplified, various other types of processing are also possible. For example, processing of changing the color of each point constituting a point group, thinning down points to be displayed, or replacing each point with a three-dimensional object having a specific shape before rendering is possible. Through such processing, for example, it is possible to convert a person into a single-color person who maintains only the outer shape and to express a person in accordance with the use of a female user who does not wear makeup or the use for the purpose of not identifying a facial expression or clothes. In addition, in order to reduce the amount of data to be transmitted and to avoid realistic representation by photographed images, for parts other than the face of a human body, processing of representing a posture and a motion of a person by fleshing out information representing a skeleton obtained by calculation from acquired image and/or depth information using a virtual 3D CG object is also possible. Alternatively, it is also possible to selectively display parts of the body of a user to be displayed on the basis of information representing a skeleton, such as not rendering anything other than the face or the face and one hand. In addition, processing of covering the surrounding of a user with light such that the user stands out or appropriately coloring each point with a color close to a background color depending on a viewpoint position to make it blend into the background such that a user other than the certain user does not stand out, so-called implementing optical camouflage, is also possible.

Further, an example in which the person capture unit 13 constantly and continuously identifies the viewpoint position 24 of the user 91 and the image display unit 15 tracks the viewpoint position 24 and displays an image of the shared virtual space 41 viewed from the viewpoint position 24 on the display surfaces of the displays 42A to 42C is shown in the present embodiment. This configuration gives the user 91 a sense of presence visually according to motion parallax when the user 91 moves. However, in situations such as conferences, movement of the viewpoint position 24 of the user 91 may not be significant. Considering such a case, it is also possible to adopt a configuration in which the viewpoint position 24 of the user 91 is not constantly tracked.

As another example, once the person capture unit 13 identifies the viewpoint position 24 of the user 91, the image display unit 15 may fix the viewpoint position 24 and display an image of the shared virtual space 41 viewed therefrom on the display surfaces of the displays 42A to 42C. For example, in a previous sensing operation, the user 91 may take a natural posture and the person capture unit 13 may identify the viewpoint position 24 during that time. Alternatively, the person capture unit 13 may identify the viewpoint position 24 a plurality of times during a certain period of time and set the average value as an average viewpoint position, and the image display unit 15 may display an image of the shared virtual space 41 viewed from the average viewpoint position on the display surfaces of the displays 42A to 42C. Alternatively, the person capture unit 13 may continuously calculate the viewpoint position 24 of the user 91 for a certain period of time, the image display unit 15 may track the viewpoint position 24 and display an image of the shared virtual space 41 viewed from the viewpoint position 24 on the display surfaces of the displays 42A to 42C, and the person capture unit 13 may calculate an average viewpoint position during that time, and the image display unit 15 may perform convergence to the average viewpoint position from the viewpoint position 24 identified by the person capture unit 13 over a predetermined period of time.

As further another example, the image display unit 15 may determine a reference viewpoint position in advance and display an image of the shared virtual space 41 viewed from a reference designated position on the display surfaces of the displays 42A to 42C. In such a case, processing of identifying the viewpoint position 24 of the user 91 by the person capture unit 13 is unnecessary. As the reference viewpoint position, for example, a viewpoint position when a person with a standard build uses the communication terminal device 10 may be used. Alternatively, viewpoint positions of a plurality of users using the communication terminal device 10 may be measured and the average value thereof may be used as the reference designated position. As a viewpoint position fixed by such calculations and definitions, a viewpoint position determined at the time of previously using the device may be reused by reading information saved in a server on the communication network 90 when each user connects to the communication network 90 or by reading information saved in the communication terminal device of the own user.

The communication terminal device 10 of the present embodiment constitutes, for example, a conference booth for one person. A plurality of conference booths may be arranged in the same room. Further, a conference booth is likely to be arranged in private residences for telecommuting. In such a case, it is desirable to take measures against noise such that the voice of the user 91 does not leak to the surroundings. Therefore, the audio output unit 16 may be capable of outputting audio through an earphone, a neck speaker, or the like. Further, the audio output unit 16 may have a speaker having directivity toward the user position 51. Furthermore, the communication terminal device 10 may reduce the voice of the user 91 leaking to the surroundings by a mute speaker. Further, output from the audio output unit 16 may be completely turned off, and voices from other users may be converted into text by voice recognition technology and output the text to the image display unit 15 instead of being output from the audio output unit 16.

In addition, although an example in which the image display unit 15 includes the three displays 42A to 42C is shown in the present embodiment, other configurations are also possible. For example, the image display unit 15 may further include a display arranged in proximity to the bottom edges of the displays 42A, 42B, and 42C and having a display surface on the rectangular upper surface in addition to the displays 42A to 42C. Further, the image display unit 15 may further include a display arranged in proximity to the edges of the displays 42A, 42B, and 42C in the ceiling direction and having a display surface on the rectangular lower surface. In either case, the image display unit 15 uses information on a viewpoint position of the own user updated in real time and displays a video of the shared virtual space viewed from the real time viewpoint position on the display surfaces of the four displays. In a usage pattern in which the user position 51 and the user direction 52 of each device are arranged and a plurality of users view a screen video together, as shown in FIG. 13, the video of the shared virtual space can be viewed in a visual field that expands to the bottom and top surfaces. Further, the communication terminal device 10 may have functions of a computer capable of executing application software and display a screen of the application software, for example, on the display surface of a display having a display surface on the upper surface thereof. In such a case, the display may be a touch panel display, and the operation of the application software by the user 91 may be received. A display having a display surface on the upper surface thereof and a display having a display surface on the lower surface thereof described here may be arranged at an angle of 0° to 180° with respect to the horizontal plane.

Further, an example in which the imager 40A is arranged on the upper edge or the left edge of the display surface of the display 42A, and the imager 40C is arranged on the upper edge or the right edge of the display surface of the display 42C is shown in the present embodiment. However, it is not limited to this configuration. As another example, the imager 40A may be arranged at a position at which the upper edge of the display surface of the display 42A and the upper edge of the display surface of the display 42B are adjacent to each other, and the imager 40C may be arranged at a position at which the upper edge of the display surface of the display 42C and the upper edge of the display surface of the display 42B are adjacent to each other, or the positions may not be directly above or adjacent to the sides of the displays. The purpose of arranging the imagers 40A to 40C is to widely acquire an image and depth information of the own user 23 such that the entire image of the own user can be acquired, or to acquire a specific part such as the facial expression and a palm of the own user at high resolution, and the imagers 40A to 40C may be arranged far away from or close to the user position 51 according to the purpose. In addition, even if each imager and each display are not connected directly or indirectly via a connector or the like, each display may be fixed to a fixing bracket standing on the indoor floor where the image display unit 15 is fixedly arranged or to a fixing bracket suspended from the ceiling if it is a method of fixing relative positions and relative angles of each imager and each display.

Further, the communication terminal device 10 of the present embodiment may have an external connection terminal, connect a personal computer to the external connection terminal, and be controlled by the personal computer. The communication terminal device 10 outputs control data for receiving control regarding the audio acquisition unit 11, the visual information acquisition unit 12, the person capture unit 13, the information transmission unit 14, the image display unit 15, the audio output unit 16, and the arrangement designation reception unit 17 through the external connection terminal, and receives control information for the control data through the external connection terminal. For example, the arrangement designation reception unit 17 may output data of the arrangement designation screen 60 shown in FIG. 10 to the personal computer through the external connection terminal, receive control information such as one for moving the desk icon 62, or the like from the personal computer through the external connection terminal, and receive designation of an arrangement of the user spaces 22 and 32 with respect to the shared virtual space 41 on the basis of the acquired control information. Further, the image display unit 15 may configure the image screen 65 illustrated in FIG. 13 in the shared virtual space 41 on the basis of the control information acquired from the personal computer via the external connection terminal, and display the image on the display surface. The external connection terminal is, for example, a wired LAN terminal or a USB terminal. The control information is directly exchanged between the personal computer and the communication terminal device 10 or exchanged via a server on the communication network 90. At this time, a wireless connection such as a wireless LAN or Bluetooth may be used instead of a physical connection terminal. Another example is a terminal conforming to the communication standard of HDMI (High-Definition Multimedia Interface) (HDMI is a registered trademark). The control information is transmitted by being inserted into HDMI capture information. In either case, the personal computer may unilaterally transmit a control signal to the communication terminal device 10, that is, control may be performed in a situation where no control data is sent from the communication terminal device 10 to the personal computer.

In addition, the communication terminal device 10 of the present embodiment may be controlled by the user 91 using a gesture. The communication terminal device 10 stores gesture setting information in which predetermined operations (hereinafter referred to as control operations) using a hand are associated in advance with predetermined control regarding the audio acquisition unit 11, the visual information acquisition unit 12, the information transmission unit 14, the image display unit 15, the audio output unit 16, and the arrangement designation reception unit 17. When the person capture unit 13 monitors a motion of a captured person and detects that the person has performed a control operation, the audio acquisition unit 11, the visual information acquisition unit 12, the information transmission unit 14, the image display unit 15, the audio output unit 16, or the arrangement designation reception unit 17 is instructed to perform control associated with the control operation in the gesture setting information. As an example, an operation of moving an object that is configured in the shared virtual space 41 as a virtual object shared by a plurality of communication terminal devices 10 and whose image is displayed on the display surface will be described. In the gesture setting information, a first control operation of placing a hand over an object is associated with first control of placing the object in a selected state, and a second control operation of moving a grasped hand toward the object is associated with second control of moving the object within the shared virtual space 41. The person capture unit 13 detects the first control operation on the basis of visual information acquired by the visual information acquisition unit 12. When the person capture unit 13 detects the first control operation, the image display unit 15 sets the object in a selected state. At this time, the person capture unit 13 determines, as an object selected by the user 41, an object on a straight line connecting the viewpoint position 24 in the shared virtual space 41 and the center position of an open hand, on a straight line connecting a joint position of a specific part of the body such as an elbow or shoulder joint and the center position of the hand, or near any of the straight lines, and the image display unit 15 sets the object in a selected state. For example, selection of an object may be indicated by highlighting the object, for example, by color, light, shadow, or the like. The information transmission unit 14 may notify other devices that the first control operation has been detected or that the object has been set to the selected state. In such a state, when the person capture unit 13 detects the second control operation, the image display unit 15 moves the object in the shared virtual space 41. At this time, the image display unit 15 moves the object when the second control operation is detected after the first control operation is detected but does not move the object when the second control operation is detected without detection of the first control operation. The movement of the object in the shared virtual space 41 is transmitted to other devices through image transmission information, and the object also moves in display of the other devices. In addition, although movement of a virtual object is illustrated here, an object moved by a gesture is not particularly limited. For example, the image screen 65 shown in FIG. 13 may be moved, or the size, position, and angle thereof may be changed.

Further, although the communication terminal device 10 displays an image of the shared virtual space 41 viewed from one viewpoint position 24 on the display surface in the present embodiment, the present invention is not limited to this example. As a modified example, the communication terminal device 10 may display an image composed of two images (hereinafter referred to as a left-eye image and a right-eye image) in the shared virtual space 41 to which a parallax is given for the left and right eyes. The image display unit 15 includes a display device that displays an image on a display surface, and a three-dimensional glasses device worn by the user 91. The image display unit 15 generates a left-eye image and a right-eye image and displays them on the display surface. The three-dimensional glasses device shows the left-eye image to the left eye of the user 91 and the right-eye image to the right eye of the user 91. By providing a parallax to the left and right eyes, it is possible to give an image a three-dimensional effect and give the user 91 a higher sense of presence and immersion. A method of showing an image with a parallax to the left and right eyes is not particularly limited. For example, an anaglyph type, a polarization type, or a liquid crystal shutter type may be adopted. In general, three-dimensional glasses do not give a sense of uneasiness or discomfort like a head-mounted display.

Although an example in which the own device and other devices share exactly the same shared virtual space 41 is shown in the present embodiment, the present invention is not limited thereto. As another example, the arrangement of the user space 22 of the own device and the user spaces 32 of other devices with respect to the shared virtual space 41 may be different for the own device and the other devices. For example, the arrangement may be adjusted such that the user 91 can easily view the facial expressions and actions of other users from the own user within a range that does not cause discomfort for the user 91 in consideration of the arrangement and size of the display of each device. When the shared virtual space 41 with different arrangements for the own device and other devices is used, information on an arrangement used by each device may be shared by all devices, and each device may select an imager that will transmit visual information to each of the other devices. Alternatively, each device may designate a direction in which desirable visual information is imaged for each of other devices, and each device may send, to each device, visual information imaged in the direction designated by the corresponding device.

In addition, although an example in which the communication terminal device 10 displays a real-time photographed image with respect to a face part is shown in the present embodiment, the present invention is not limited to this example. As another example, a device on a transmitting side may notify a device on a receiving side of a mental state of the user 91, and the device on the receiving side may process a user's facial expression to be displayed on the basis of the notified mental state. In the information transmission unit 14 of the own device, the person capture unit 13 of the own device estimates a metal state of the own user from the own user's facial expression. For example, it estimates any of states in which the own user is happy, angry, sad, having fun, agreeing with the content of a conversation, not agreeing, and not understanding. The information transmission unit 14 of the own device transmits information on the mental state estimated by the person capture unit 13 to the device on the receiving side as image transmission information instead of an image of the face part. The device on the receiving side generates and displays an image of a face part of the user on the transmitting side on the basis of the notified information on the metal state. Accordingly, it is possible to visualize qualitative information that is difficult to visualize, such as the psychology of the other party, and to assist in realizing more strategically effective communication. Further, it is possible to reduce the amount of data transmitted between devices.

As further another example, the device on the transmission side may be able to process a facial expression in visual information of the user 91 into an expression representing a mental state desired by the user 91 at the request of the user 91. When the person capture unit 13 of the own device receives designation of a desired mental state from the user 91, the person capture unit 13 processes the facial expression of the user 91 into an expression representing the designated mental state. The information transmission unit 14 transmits image transmission information in which the facial expression has been processed by the person capture unit 13 to other devices. Since the facial expression can be processed as desired by the user 91, the user 91 can intentionally use information conveyed through the facial expression to achieve effective communication.

Embodiment 2

In embodiment 1, the communication terminal device 10 selects an imager that acquires an image to be transmitted to other devices and transmits image transmission information including information on an image and a depth acquired by the selected imager to the other devices. Accordingly, the amount of data of the image transmission information to be transmitted from the own device to the other devices is reduced. Embodiment 2 shows an example of further reducing the amount of data of image transmission information to be transmitted from the own device to other devices.

The configuration of the communication system 1 of embodiment 2 is basically the same as that of embodiment 1 shown in FIG. 1. Further, the configuration of the communication terminal device 10 of embodiment 2 is the same as that of embodiment 1 shown in FIG. 6 to FIG. 8. Image display processing executed by the communication terminal device 10 of embodiment 2 is basically the same as that of embodiment 1 shown in FIG. 9. However, in embodiment 2, specific processing in steps S102 and S103 differs from processing in embodiment 1.

In embodiment 2, the person capture unit 13 detects the own user in the user space 22 on the basis of an image and/or a depth of the user space 22 acquired by the visual information acquisition unit 12, and the information transmission unit 14 generates information representing the face part of the own user detected from information on the image and/or depth of the user space 22 acquired by the visual information acquisition unit 12 and information representing the skeleton of the own user and transmits such information to other devices as image transmission information in step S102. Here, information representing a skeleton is information enables identification of a posture of a person, and may be information representing the position of a characteristic part of a body, such as the head, torso, buttocks, shoulders, elbows, hands, knees, and heels, for example. The posture of a person mentioned here is a form of a human body that allows a person to visually observe poses and actions and obtain non-verbal information useful for communication. There is no particular limitation on how detailed and accurate the posture should be identified.

In embodiment 2, the image display unit 15 appropriately converts a three-dimensional object in a shared virtual space including a person represented by synthesizing a face image based on information representing a face part received from another device and an image of a person's posture based on information representing a skeleton received from the other device into a two-dimensional image in accordance with a user's viewpoint position and displays the two-dimensional image on the display surfaces of the displays 42A to 42C in step S103. The image of the person's posture based on the information representing the skeleton may be, for example, an image that has been processed to represent the person's posture and actions by fleshing out the information representing the skeleton using a virtual 3D CG object.

According to the present embodiment, since it is not necessary to send whole imaged information from the communication terminal device 10 on the transmitting side to the communication terminal device 10 on the receiving side, the amount of data transmitted between the communication terminal devices 10 can be reduced. Further, since parts of a human body other than the face are represented by virtual objects, it is possible to avoid realistic display of a photographed image.

Embodiment 3

In embodiment 1, a configuration in which the communication terminal device has three displays each having a rectangular planar display surface arranged facing a user position, as shown in FIG. 6 to FIG. 8, is illustrated. On the other hand, in embodiment 3, a configuration in which the communication terminal device 10 has one display having a curved display surface that is curved to surround a user position is illustrated.

Figure 15:
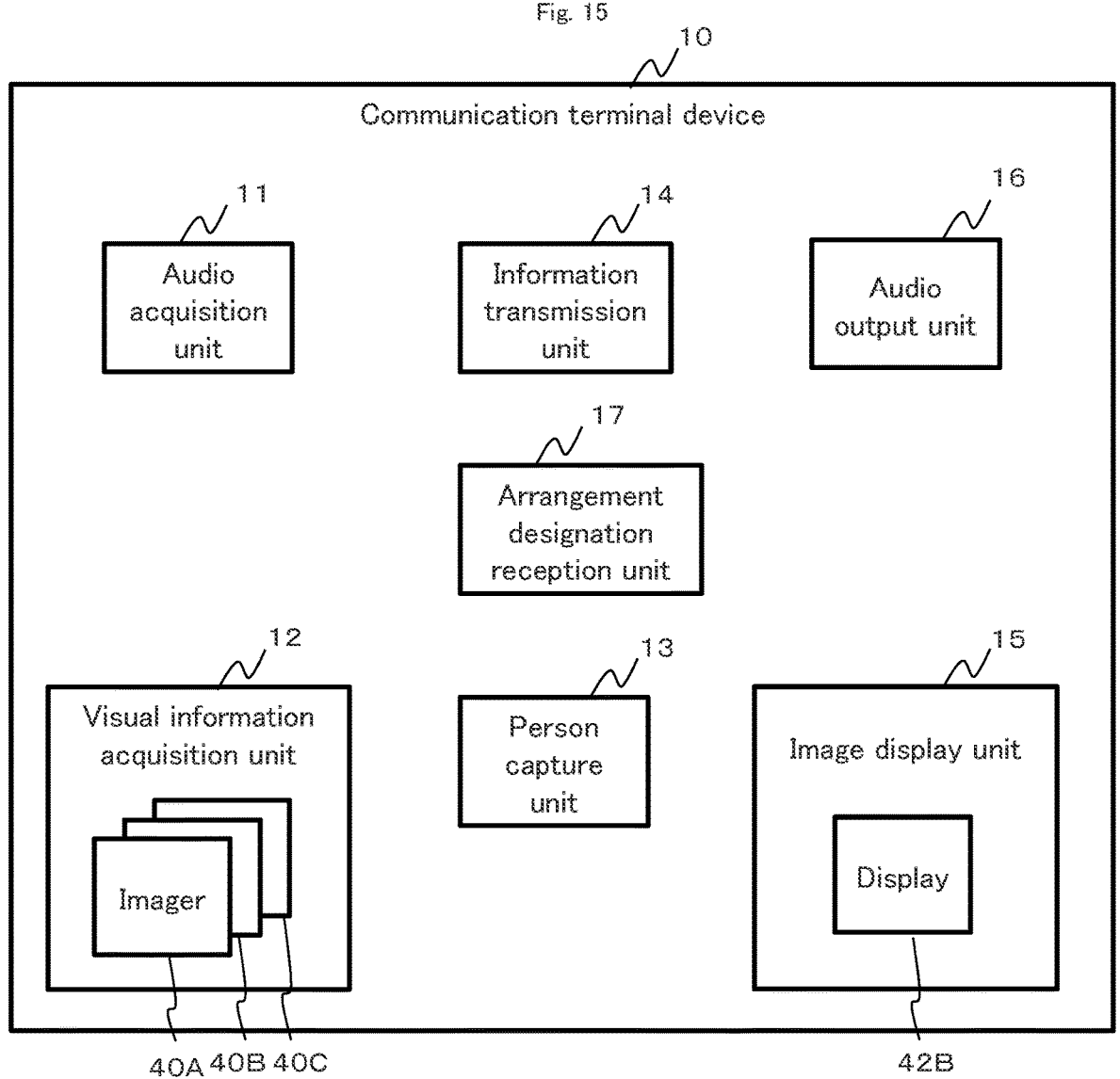
FIG. 15 is a block diagram of a communication terminal device according to embodiment 3.

FIG. 15 is a block diagram of a communication terminal device according to embodiment 3. The communication terminal device 10 according to the present embodiment includes the audio acquisition unit 11, the visual information acquisition unit 12, the person capture unit 13, the information transmission unit 14, the image display unit 15, the audio output unit 16, and the arrangement designation reception unit 17. The audio acquisition unit 11, the visual information acquisition unit 12, the person capture unit 13, the information transmission unit 14, the image display unit 15, and the audio output unit 16 are basically the same as those in the embodiment shown in FIG. 2. The arrangement designation reception unit 17 receives designation by a user regarding an arrangement of the user space 22 of the own device and the user space 32 of another device with respect to the shared virtual space 41.

In the present embodiment, the image display unit 15 has one display 42B unlike embodiment 1.

Figure 16:
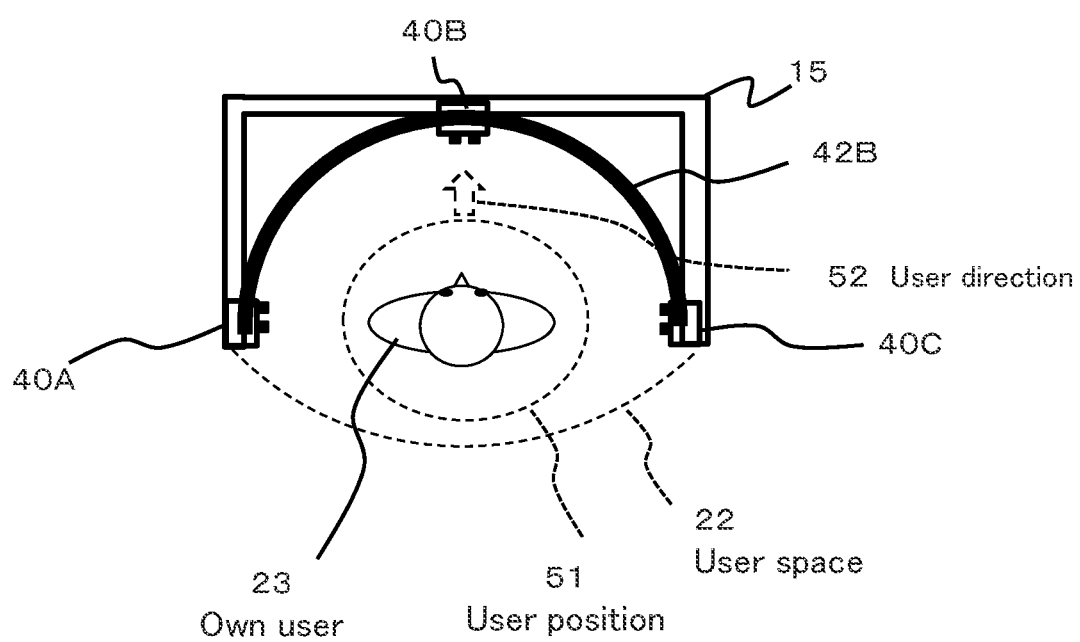
FIG. 16 is a schematic plan view of the communication terminal device according to embodiment 3.
Figure 17:
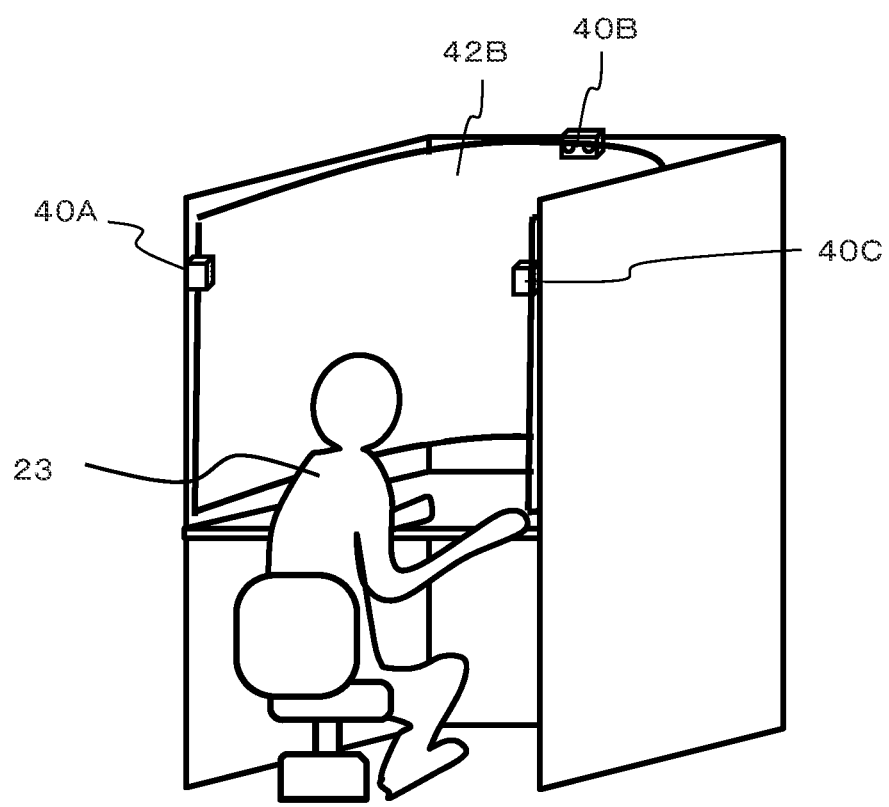
FIG. 17 is a schematic perspective view of the communication terminal device of embodiment 3.

FIG. 16 is a schematic plan view of the communication terminal device according to embodiment 3. FIG. 17 is a schematic perspective view of the communication terminal device of embodiment 3.

As shown in FIG. 16, in embodiment 4, a predetermined position in the user space 22 is defined as a user position 51, and a predetermined direction from the user position 51 is defined as a user direction 52 as in embodiment 1. For example, the user position 51 is a position at which the own user 23 using the communication terminal device 10 is likely to be present. For example, the user direction 52 is a direction in which the own user 23 using the communication terminal device 10 is likely to face.

As shown in FIG. 17, the display 42B is a display device having a curved display surface that is curbed to surround the user position 51. More specifically, the display surface of the display 42B is a curved surface extending over a predetermined angular range (180° as an example) in the circumferential direction of the inner surface of a cylinder. The display 42B may have a configuration in which a plurality of projectors project videos onto a curved screen, or may be an arrangement of a curved organic EL display. The center of the display surface of the display 42B in the left-right direction is arranged in the user direction 52 when viewed from the user position 51.

Embodiment 4

In embodiment 1, a configuration in which the communication terminal device includes three displays each having a rectangular and planar display surface arranged facing a user position and three imagers separated from each other in the horizontal direction and arranged with imaging directions toward the user position is illustrated, as shown in FIG. 6 to FIG. 8. On the other hand, in embodiment 4, a configuration in which the communication terminal device 10 includes one display having a rectangular and planar display surface facing a user position and one imager arranged with an imaging direction toward a user position is illustrated.

Figure 18:
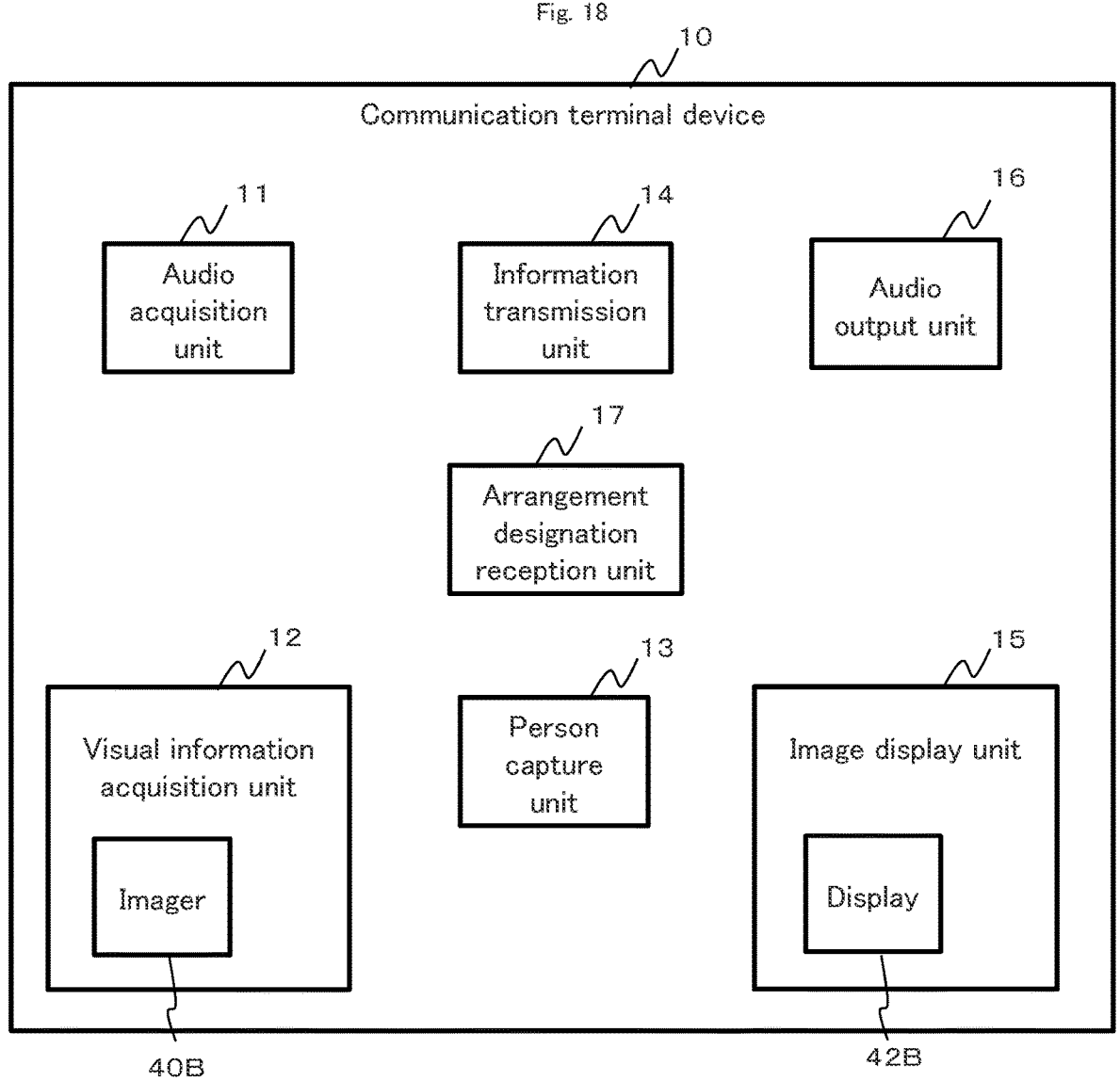
FIG. 18 is a block diagram of a communication terminal device according to embodiment 4.

FIG. 18 is a block diagram of a communication terminal device according to embodiment 4. The communication terminal device 10 according to the present embodiment includes the audio acquisition unit 11, the visual information acquisition unit 12, the person capture unit 13, the information transmission unit 14, the image display unit 15, the audio output unit 16, and the arrangement designation reception unit 17. The audio acquisition unit 11, the visual information acquisition unit 12, the person capture unit 13, the information transmission unit 14, the image display unit 15, and the audio output unit 16 are basically the same as those in the embodiment shown in FIG. 2. The arrangement designation reception unit 17 receives designation by a user regarding an arrangement of the user space 22 of the own device and the user space 32 of another device with respect to the shared virtual space 41.

In the present embodiment, the visual information acquisition unit 12 has one imager 40B, and the image display unit 15 has one display 42B unlike the first embodiment.

Figure 19:
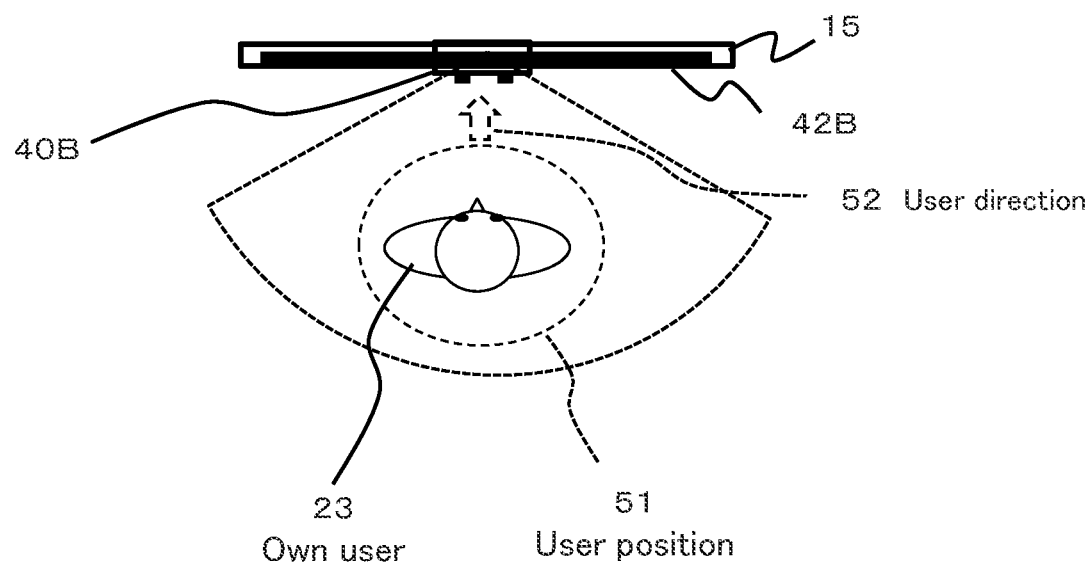
FIG. 19 is a schematic plan view of the communication terminal device according to embodiment 4.
Figure 20:
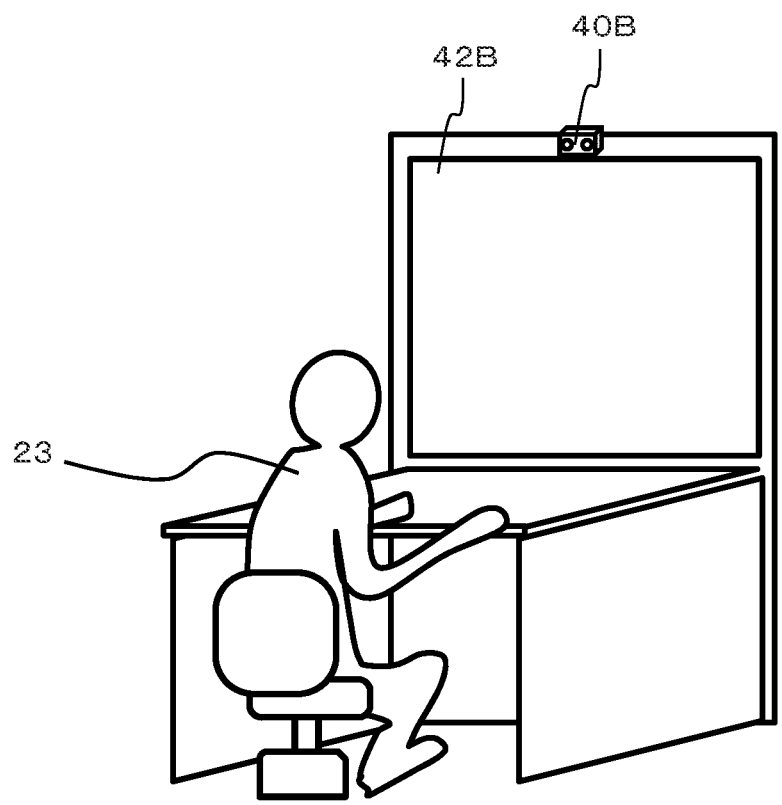
FIG. 20 is a schematic perspective view of the communication terminal device of embodiment 4.

FIG. 19 is a schematic plan view of the communication terminal device according to embodiment 4. FIG. 20 is a schematic perspective view of the communication terminal device of embodiment 4.

As shown in FIG. 19, in embodiment 4, a predetermined position in the user space 22 is defined as a user position 51, and a predetermined direction from the user position 51 is defined as a user direction 52 as in embodiment 1. For example, the user position 51 is a position at which the own user 23 using the communication terminal device 10 is likely to be present. For example, the user direction 52 is a direction in which the own user 23 using the communication terminal device 10 is likely to face.

As shown in FIG. 20, the display 42B is a display device that has a rectangular and planar display surface arranged facing the user position 51. The display 42B is arranged in the user direction 52 when viewed from the user position 51. The imager 40B is arranged such that a relative position with respect to the user position 51 is fixed, a relative direction with respect to the user direction 52 is fixed, and an imaging direction faces the user position 51. Desirably, the imager 40B is arranged near the center of the upper edge or the lower edge of the display surface of the display 42B.

Figure 21:
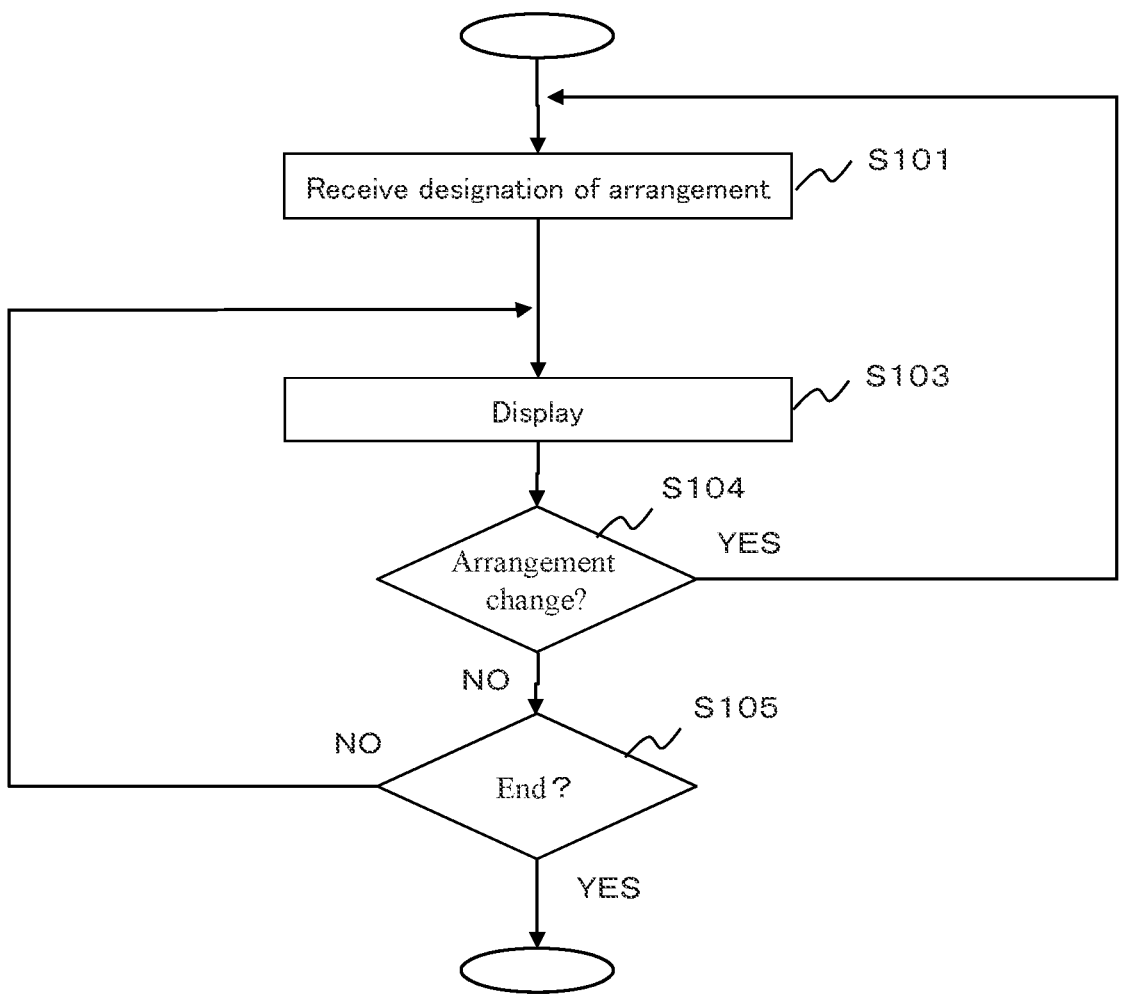
FIG. 21 is a flowchart cf image display processing in embodiment 4.

FIG. 21 is a flowchart of image display processing in embodiment 4. Image display processing in embodiment 4 is basically the same as that of embodiment 1 shown in FIG. 9 except that there is no processing in step S102 for selecting transmission data. As described above, in embodiment 4, the visual information acquisition unit 12 has one imager 40B and the information transmission unit 14 transmits image transmission information including image and depth information acquired by the imager 40B to other devices.

The communication terminal device 10 of the present embodiment can be configured as a device in which the audio acquisition unit 11, the visual information acquisition unit 12, the person capture unit 13, the information transmission unit 14, the image display unit 15, and the audio output unit 16 are built in a housing, the imager 40B of the visual information acquisition unit is arranged at a predetermined position of the housing, and an external output terminal connected to the display having a planar display surface and outputting image data from the image display unit 15 to the display is provided in the housing. In such a configuration, the image display unit 15 receives designation of a size of the display surface and a relative position and a relative posture of the display surface with respect to the housing, generates data of an image of a shared virtual space viewed from a viewpoint position of the own user on the display surface on the basis of the designation, and outputs the data through the external output terminal. By connecting a general-purpose planar display to the outside, it is possible to easily configure the communication terminal device 10 that realizes communication sharing a space. Although a configuration including only one display 42B is shown in the present embodiment, a configuration including a plurality of external output terminals from the housing and a plurality of displays may be adopted. In this case, designation of the size of the display surface and the relative position and the relative posture of the display surface with respect to the housing, received by the image display unit 15, needs to be performed by the number of connected displays.

Further, as described above, since the communication terminal device 10 of the present embodiment has one imager 403 included in the visual information acquisition unit 12, three-dimensional data that can be generated from image transmission information that can be transmitted to other devices is limited. Further, in the configurations of embodiments 1 and 3 represented by the configurations shown in FIG. 8 and FIG. 16, three-dimensional data that can be generated is also limited and thus may not become complete one depending on the arrangement of each imager of the installed visual information acquisition unit 12. Therefore, the own device or another device may complement a part that is not included in visual information or image transmission information of the user 91 of the communication terminal device 10 of the present embodiment, for example.

In the case of complementing by the own device, when the person capture unit 13 captures a person from visual information from the visual information acquisition unit 12, the information transmission unit 14 complements a part that is not included in the visual information of the captured person to generate image transmission information. Specifically, the information transmission unit 14 may store complementary visual information of the side and back of the user 91 acquired by the visual information acquisition unit 12 in advance and complement the side or back part of a person which is not included in visual information acquired by the visual information acquisition unit 12 according to the complementary visual information. Alternatively, the person capture unit 13 may complement the side or back part of a person which is not included in visual information acquired by the visual information acquisition unit 12 on the basis of information on parts included in the visual information. For example, if the user 91 wears black clothes, visual information of the back of the user 91 may be created in black.

In the case of complementing by another device, the information transmission unit 14 and/or the server on the communication network 90 complement a part of a person included in image transmission information transmitted from the own device (another device for the other device), which is not included in the image transmission information. Specifically, the information transmission unit 14 may acquire complementary visual information of the side and back of the user 91 from the own device (another device for the other device), store it in advance, and complement the side or back part of a person which is not included in the image transmission information according to the complementary visual information. Alternatively, the person capture unit 13 may complement the side or back part of the person which is not included in the image transmission information on the basis of information on parts included in the image transmission information.

Embodiment 5

Embodiment 1 illustrates a configuration in which the communication terminal device includes displays each having a rectangular and planar display surface, as shown in FIG. 7 and FIG. 8. Embodiment 5 illustrates a configuration in which the communication terminal device includes a display having a curved display surface.

Figure 22:
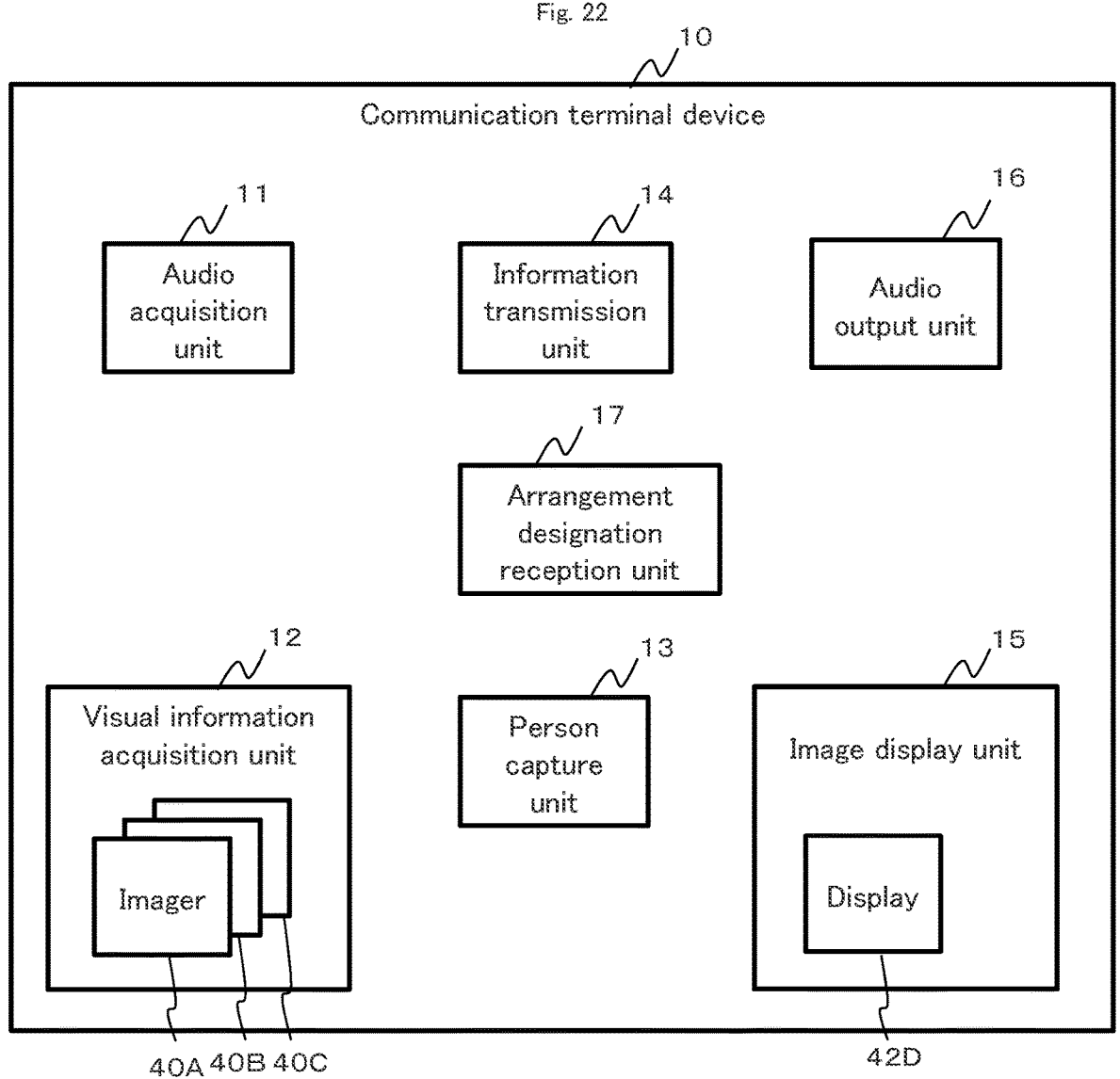
FIG. 22 is a block diagram of a communication terminal device according to embodiment 5.

FIG. 22 is a block diagram of a communication terminal device according to embodiment 5. The communication terminal device 10 according to the present embodiment includes the audio acquisition unit 11, the visual information acquisition unit 12, the person capture unit 13, the information transmission unit 14, the image display unit 15, the audio output unit 16, and the arrangement designation reception unit 17. The audio acquisition unit 11, the visual information acquisition unit 12, the person capture unit 13, the information transmission unit 14, the image display unit 15, the audio output unit 16, and the arrangement designation reception unit 17 are basically the same as those of the embodiment 1 shown in FIG. 6.

In the present embodiment, the visual information acquisition unit 12 includes three imagers 40A, 40B, and 40C, and the image display unit 15 includes one display 42D.

Figure 23:
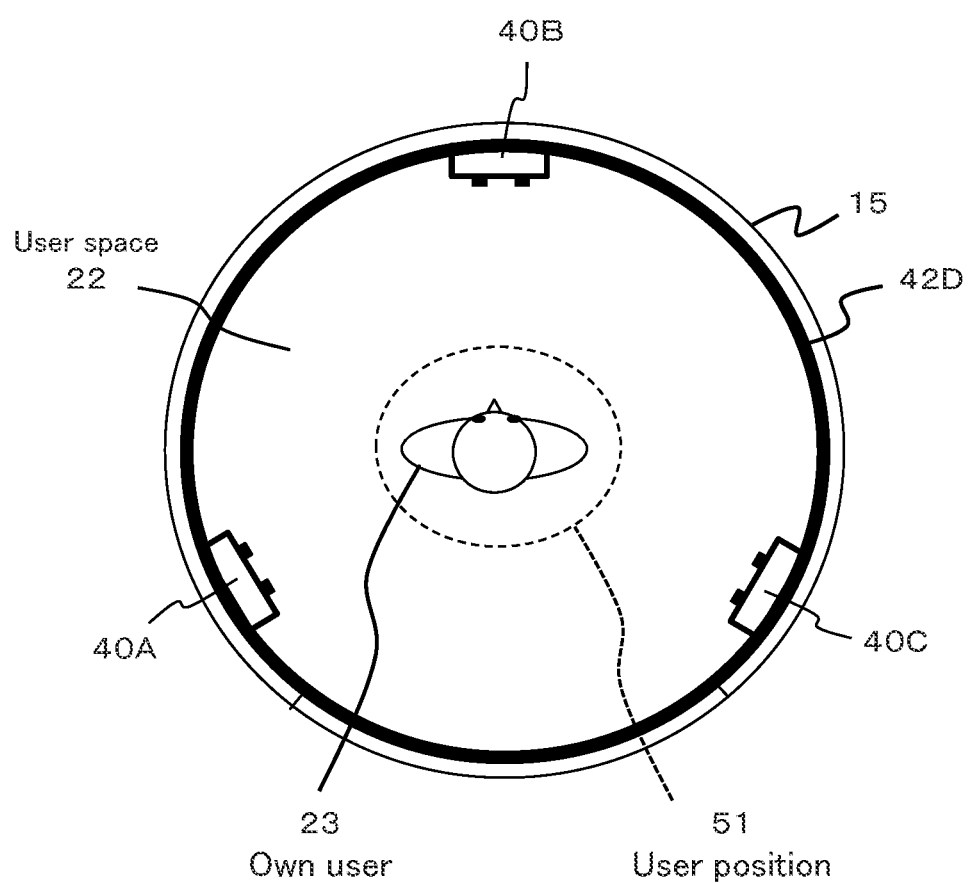
FIG. 23 is a schematic plan view of the communication terminal device according to embodiment 5.
Figure 24:
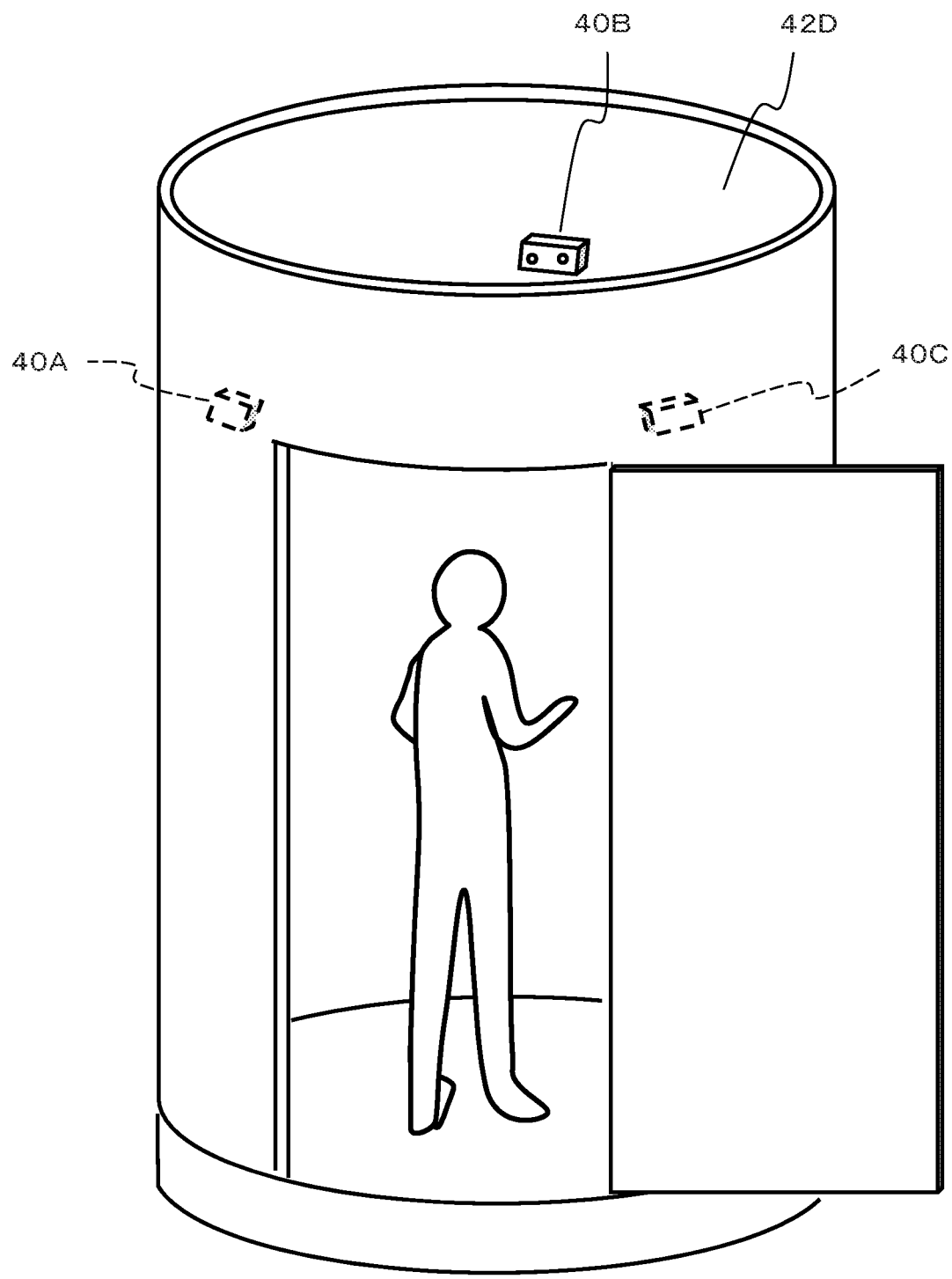
FIG. 24 is a schematic perspective view of the communication terminal device of embodiment 5.

FIG. 23 is a schematic plan view of the communication terminal device according to embodiment 5. FIG. 24 is a schematic perspective view of the communication terminal device of embodiment 5.

As shown in FIG. 23 and FIG. 24, a configuration in which the display 42D of the image display unit 15 has the inner circumferential surface of a vertical cylindrical shape as a display surface is adopted in embodiment 5. The inside of the cylinder of the display 42D serves as the user space 22. A predetermined position in the user space 22 is defined as a user position 51. For example, the user position 51 is a position at which the own user 23 using the communication terminal device 10 is likely to be present. Since the display 42D has a cylindrical shape, the user position 51 may be set in the vicinity of the central axis thereof.

The display 42D is a display device having the inner circumferential surface of a cylindrical shape surrounding the user position 51 as a display surface.

The imagers 40A to 40C are arranged in proximity to the display surface of the display 42D, having relative positions fixed with respect to the user position 51 and imaging directions facing the user position 51. The imagers 40A to 40C may be arranged, for example, in such a manner that the imager 40A is arranged in a direction in which an angle of 110° between the imager 40A and the imager 40B is formed having the central axis of the display 42D as a center, and the imager 40C is arranged in a direction in which an angle of −110° between the imager 40C and the imager 40B is formed having the central axis of the display 42D as a center. Further, the height of the imagers 40A to 40C may be a height above the head, feet, or face of a person on the assumption that the person has a standard height as the own user 23, for example.

The flowchart of image display processing in embodiment 5 is the same as that in embodiment 1 shown in FIG. 9.

Figure 25:
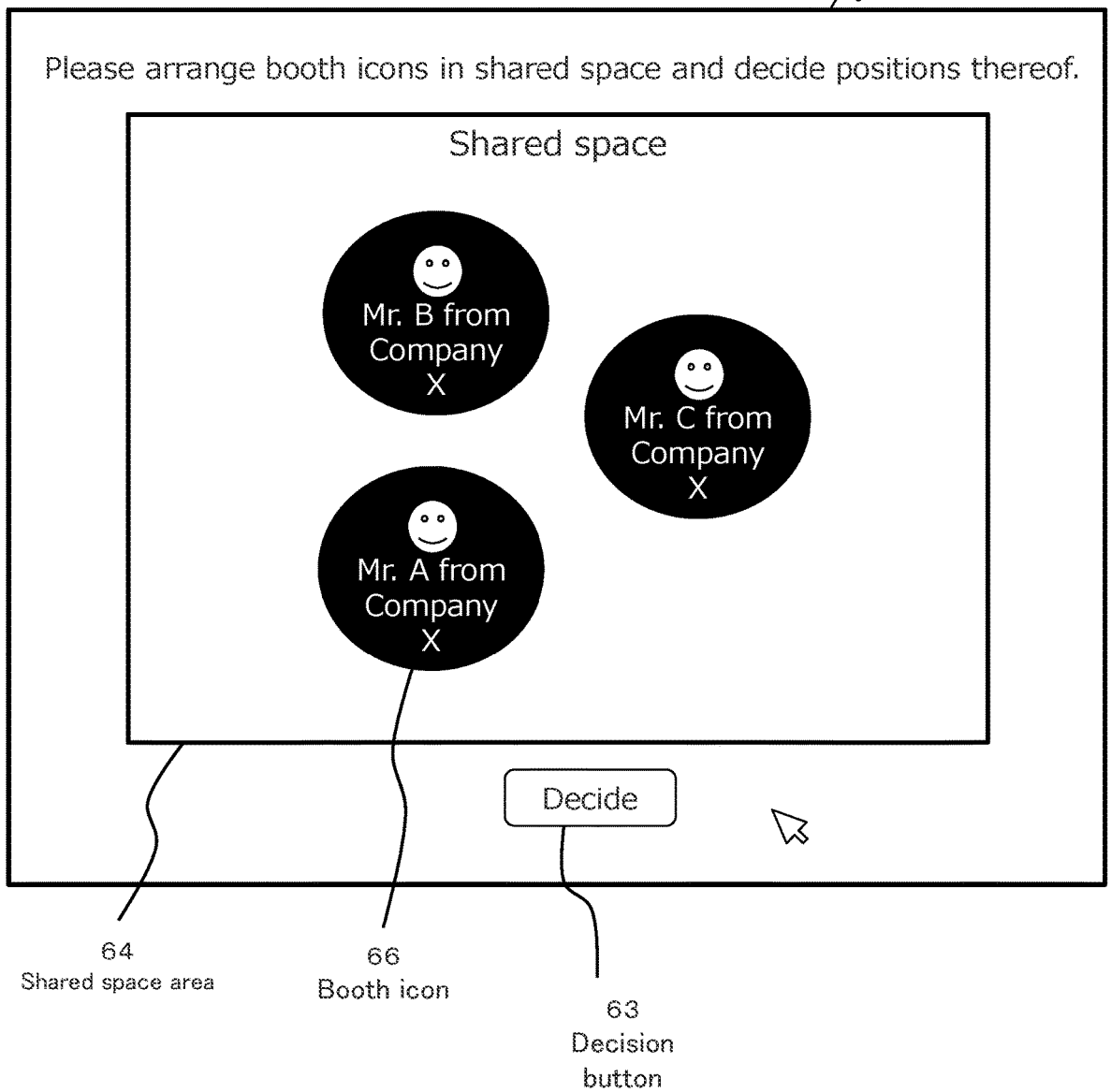
FIG. 25 is a diagram showing an example of an arrangement designation screen in embodiment 5.

FIG. 25 is a diagram showing an example of an arrangement designation screen according to embodiment 5. The arrangement designation screen 60 includes a shared space area 64 and a decision button 63. The shared space area 64 is a plan view imitating the shared virtual space 41 corresponding to a virtual space shared by the own user 23 and other users 33. A booth icon 66 that is an object corresponding to the communication terminal device 10 used by each member participating in conversions is arranged in the shared space area 64. The booth icon 66 can be moved or fixed by, for example, a mouse operation, a touch operation performed on the display surface of the display 42D, or a gesture operation detected on the basis of visual information acquired by the imagers 40A to 40C. The shape and size of the shared space area 64 may be variable. Here, as an example, the shared space area 64 imitates the shared virtual space 41, and thus the shape and size of the shared virtual space 41 may be determined according to the shape and size of the shared space area 64. When the decision button 63 is pressed, an arrangement of the user space of each communication terminal device 10 in the shared virtual space 41, the user position 51, and user positions of other devices is determined on the basis of the arrangement of the booth icon 66 in the shared space area 64 at that time. The example of FIG. 25 illustrates an arrangement in which three users form the vertices of a triangle.

Figure 26:
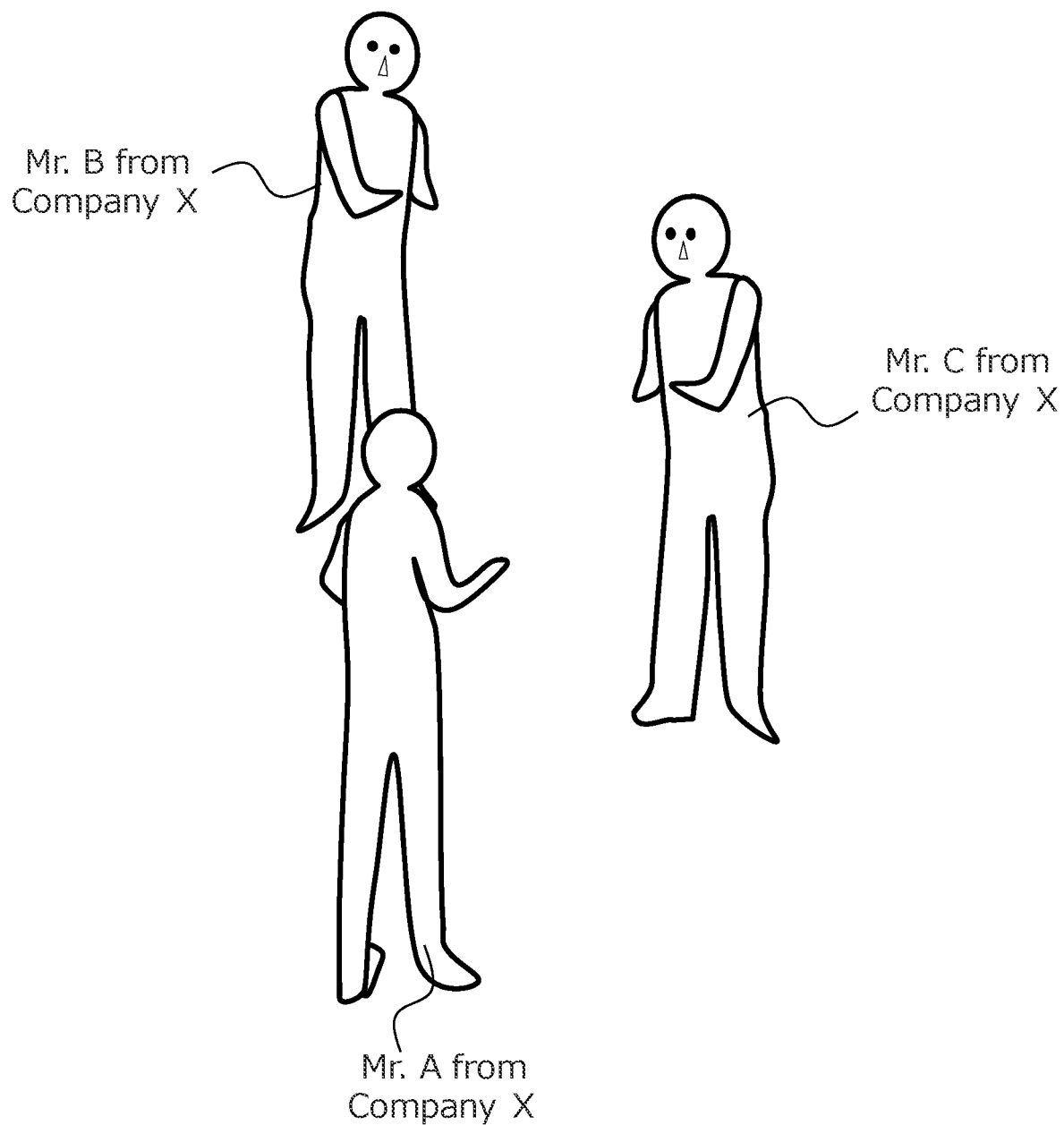
FIG. 26 is a conceptual diagram showing a state in which face-to-face conversations of a plurality of users in a shared space are simulated.

FIG. 26 is a conceptual diagram showing a state in which face-to-face conversations of a plurality of users in a shared space are simulated FIG. 26 shows an example in which the arrangement shown in FIG. 25 is simulated. In FIG. 26, Mr. A, Mr. B, and Mr. C of Company X are standing at positions forming the vertices of a triangle and having conversations. An image of the shared virtual space 41 viewed from viewpoint positions of the users is displayed in the arrangement shown in FIG. 26 on the displays 42D of the communication terminal devices 10 of the respective users. Accordingly, all users can obtain visual fields in which they are having conversations in the arrangement as shown in FIG. 26.

According to the present embodiment, the image of the virtual space shared with other users is displayed in any direction of 360 degrees when viewed from the user 23, and thus a high sense of presence can be provided to the own user 23. For example, it is possible to use a virtual space configured by CG or a three-dimensional space configured by a real photographed video as a shared virtual space and reproduce a state in which a plurality of users are having conversations together in the shared virtual space. The real photographed video may be a real-time video or a recorded video captured by a 360-degree camera at a location different from the installation location of any communication terminal device 10, for example.

In the present embodiment, an example in which the visual information acquisition unit 12 includes the three imagers 40A to 40C is shown, but the number of imagers provided in the visual information acquisition unit 12 is not limited to three. As another example, there may be two, or four or more. Also, the position at which the imager is arranged is not limited to the arrangement described in the present embodiment.

Embodiment 6

In embodiment 5, a communication terminal device having a display surface on a cylindrical inner peripheral surface was exemplified. On the other hand, in embodiment 6, a communication terminal device having a display surface on the cylindrical outer peripheral surface is exemplified.

Figure 27:
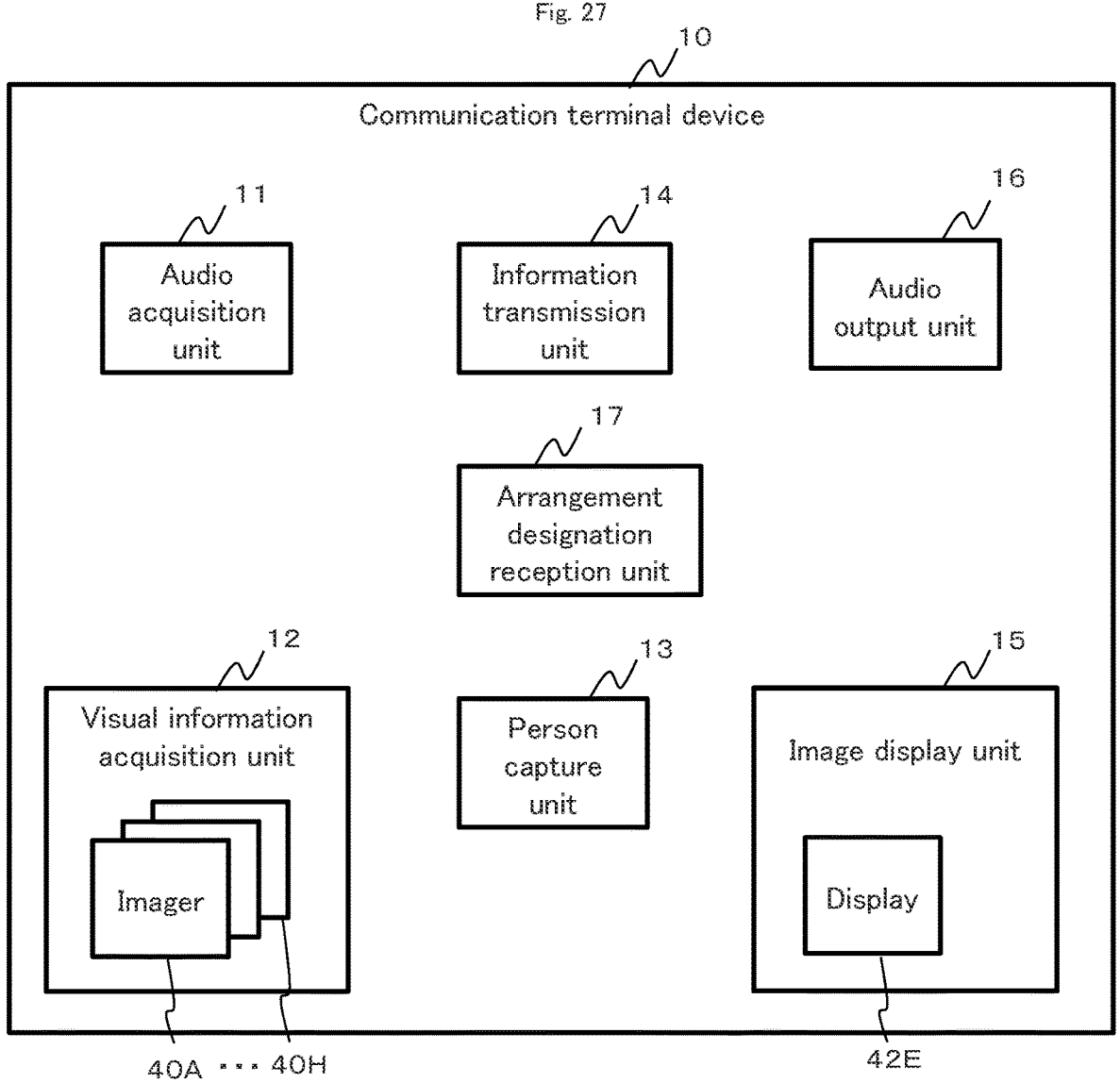
FIG. 27 is a block diagram of a communication terminal device according to embodiment 6.

FIG. 27 is a block diagram of a communication terminal device according to embodiment 6. The communication terminal device 10 according to the present embodiment includes an audio acquisition unit 11, a visual information acquisition unit 12, a person capture unit 13, an information transmission unit 14, an image display unit 15, an audio output unit 16, and an arrangement designation reception unit 17. The audio acquisition unit 11, the visual information acquisition unit 12, the person capture unit 13, the information transmission unit 14, the image display unit 15, the audio output unit 16, and the arrangement designation reception unit 17 are basically the same as those of embodiment 1 shown in FIG. 6.

In the present embodiment, the visual information acquisition unit 12 has eight imagers 40A to 40H, and the image display unit 15 has a single display 42E.

Figure 28:
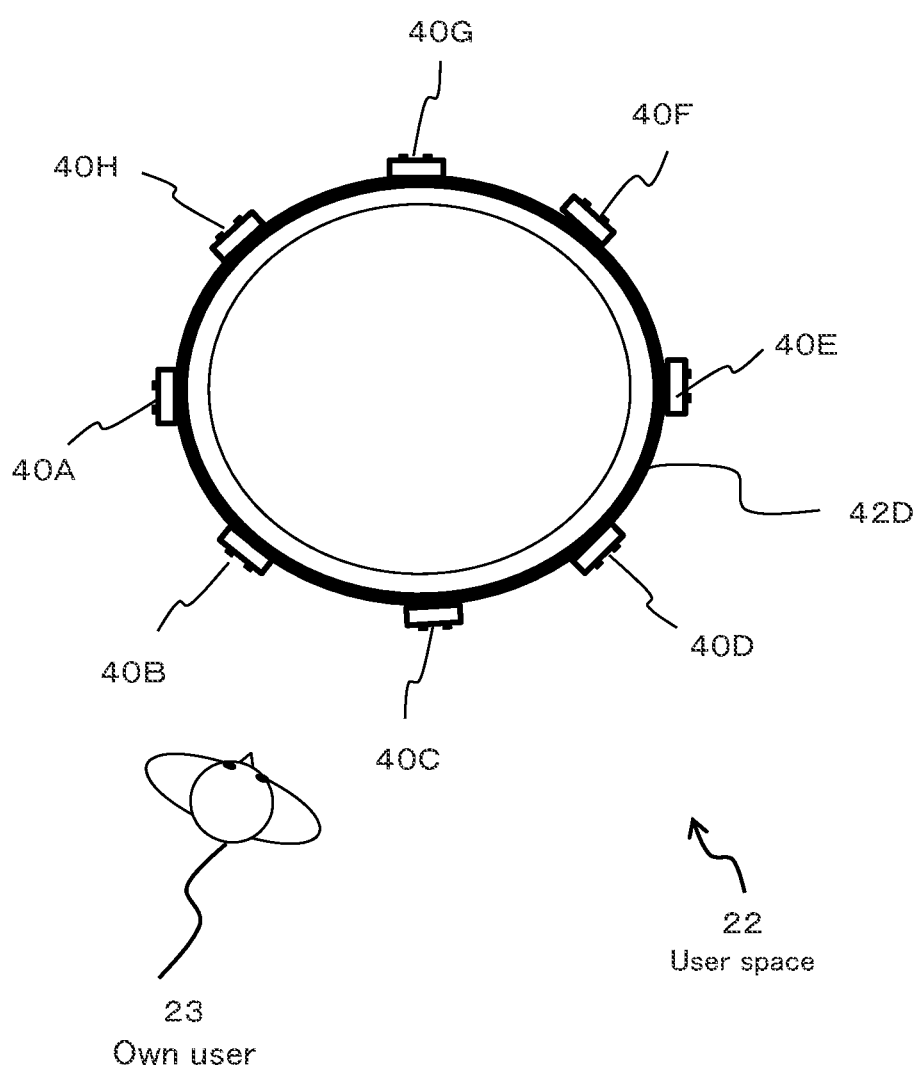
FIG. 28 is a schematic plan view of the communication terminal device according to embodiment 6.
Figure 29:
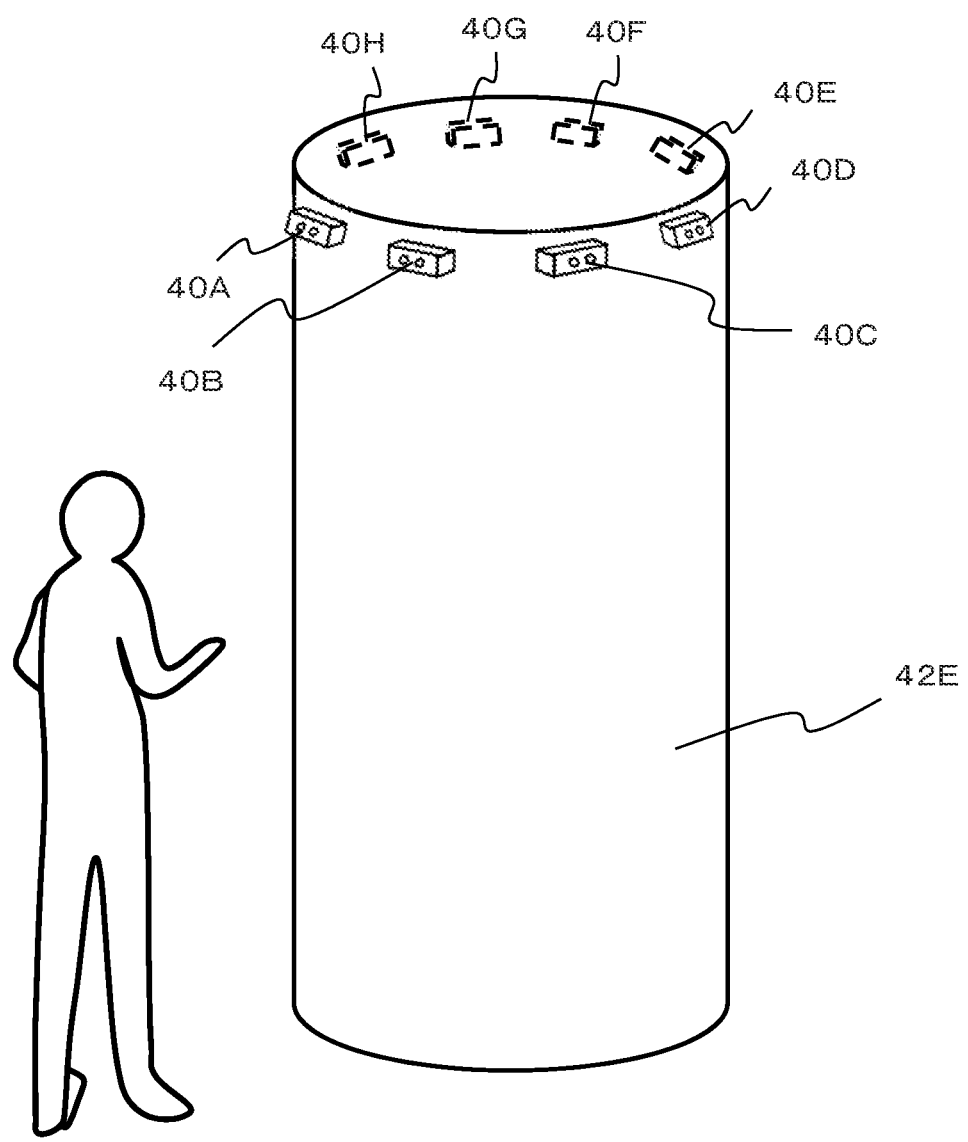
FIG. 29 is a schematic perspective view of the communication terminal device of embodiment 6.

FIG. 28 is a schematic plan view of the communication terminal device according to embodiment 6. FIG. 29 is a schematic perspective view of the communication terminal device of embodiment 6.

As shown in FIG. 28 and FIG. 29, a configuration in which the display 42E of the image display unit 15 has the outer circumferential surface of a vertical cylindrical shape as a display surface is adopted in embodiment 6.

The display 42E is a display device having the outer circumferential surface of a cylindrical shape as a display surface. The outside of the cylinder of the display 42E serves as the user space 22. The imagers 40A to 40H are positioned close to the display surface of the display 42E, fixed toward the outside of the cylinder, and arranged with imaging directions toward the user position 51. The imagers 40A to 40H may be arranged, for example, in directions in which they form an angle of 45° therebetween having the central axis of the display 42E as a center. Further, the height of the imagers 40A to 40H may be a height above the head, feet, or face of a person on the assumption that the person has a standard height as the own user 23, for example.

The communication terminal device 10 of embodiment 6 is suitable for having a conversion according to a combination with the communication terminal device 10 of embodiment 5. Hereinafter, it is assumed that the user of the communication terminal device 10 of embodiment 6 will be referred to as a user 91(5), and the user of the communication terminal device 10 of embodiment 5 will be referred to as a user 91(4).

Figure 30:
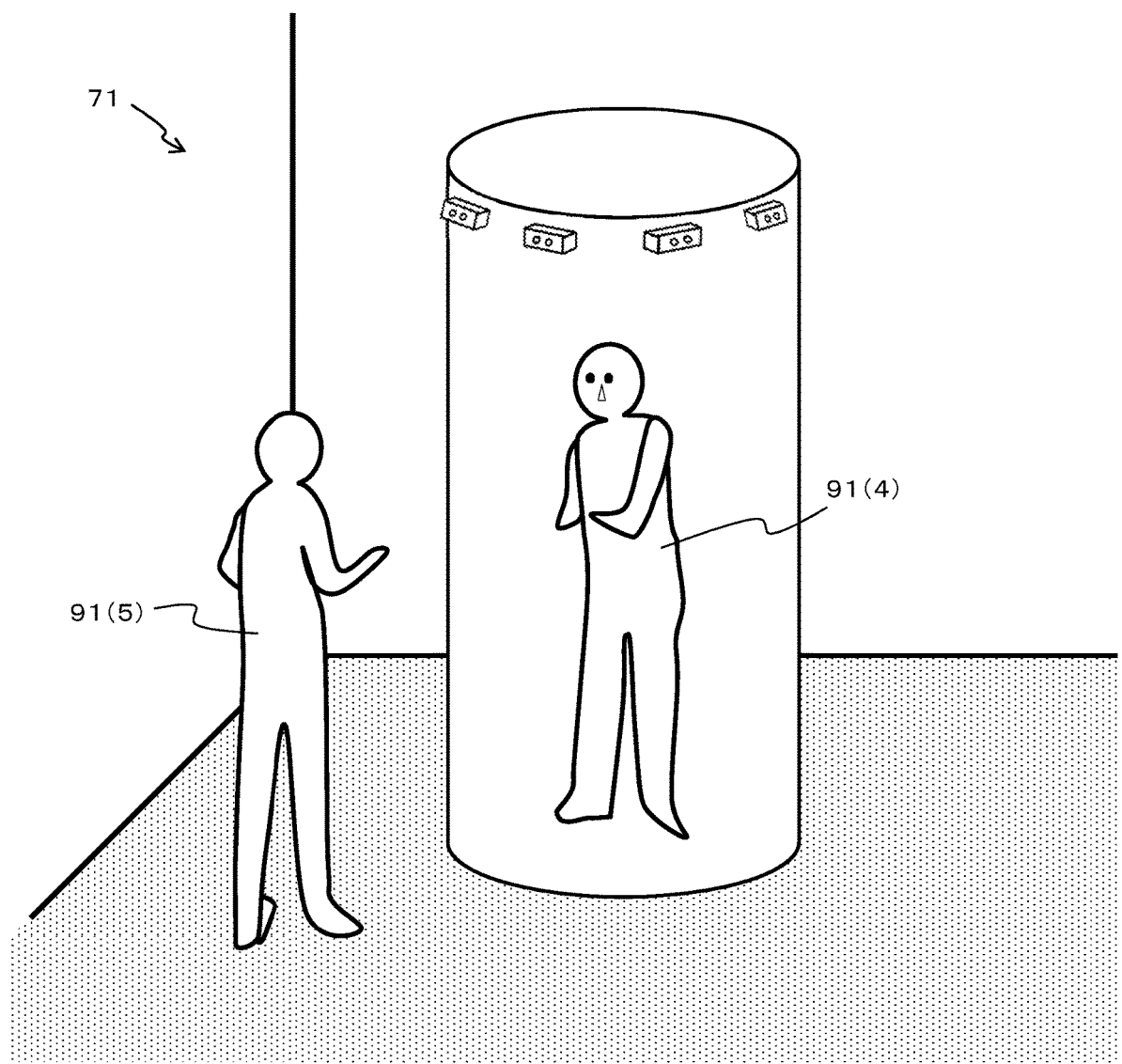
FIG. 30 is a conceptual diagram showing a visual field obtained from a user in embodiment 6.

The size of the shared virtual space 41 is set on the basis of the size of the real space in which the communication terminal device 10 of embodiment 6 is installed. For example, the shared virtual space 41 in the communication terminal device 10 of embodiment 6 may be infinite. The relative positions of the central axis of the cylindrical shape of the communication terminal device 10 of embodiment 6 and the central axis of the cylindrical shape of the communication terminal device 10 of embodiment 5 are aligned in the shared virtual space 41. Then, for example, a 360° video of the real space in which the user 91 (5) is present and the communication terminal device 10 is installed, which is created by synthesizing image videos obtained from the imagers 40A to 40H in real time, is projected to the display of the communication terminal device 10 of the user 91(4) such that the user 91(4) can obtain a visual field as if he/she entered the real space where the user 91(5) is present. The user 91(5) can obtain a visual field as if the user 91(4) appeared in the real space in which the user 91(5) is present. FIG. 30 is a conceptual diagram showing a visual field obtained from the user of embodiment 6. A state in which the user 91(4) actually present at a remote location appears in the real indoor space 71 in which the user 91(5) is actually present, and the user 91(5) and the user 91(4) are having a conversation facing each other directly is simulated.

According to the present embodiment, the own user can simultaneously view the real space in which he/she is actually present and a shared virtual space displayed on the display surface, and thus the own user can communicate with other users with a feeling as if the other users appear in the place where the own user is present. Further, other users using the communication terminal device 10 of embodiment 5 can perform communication with a feeling as if they are visiting the place where the communication terminal device 10 of embodiment 6 is installed along with the own user. For example, a use case such as inspection of a remote location is assumed.

Although a configuration in which the outer circumferential surface of a cylindrical shape serves as a display surface is illustrated in the present embodiment, the shape of the display surface is not limited to this configuration. For example, a configuration in which the outer surface of a polygonal prism, or a spherical shape serves as a display surface may be adopted, or a configuration in which the outer surface of an oval shape serves as a display surface may be adopted.

REFERENCE SIGNS LIST

1 Communication system
10 Communication terminal device
11 Audio acquisition unit
12 Visual information acquisition unit
13 Person capture unit
14 Information transmission unit
14C Imager
14B Imager
15 Image display unit
16 Audio output unit
17 Arrangement designation reception unit
21 Virtual space
22 User space
23 Own user
24 Viewpoint position.
31 Virtual space
32 User space
33 Other user
35 Whiteboard
40 Imager
41 Shared virtual space
42 Display surface
42A to 42E Display
51 User position
52 User direction
60 Arrangement designation screen
61 Conference room area
62 Desk icon
63 Decision button
64 Shared space area
65 Image screen
66 Booth icon
71 Real space
90 Communication network
91 User

The invention claimed is:

1. A communication terminal device provided in plurality and interconnected via a communication line, each of the communication terminal devices comprising:
an audio acquisition unit configured to acquire audio including a voice of an own user using an own device;
a visual information acquisition unit configured to acquire visual information for enabling formation of three-dimensional data of a person in a predetermined user space;
an information transmission unit configured to transmit, to another device, image transmission information based on visual information on the user space and audio transmission information based on the audio;
an image display unit configured to display a display image which is generated by performing a projection transformation on three-dimensional data of a person in a shared virtual space, in which a user space of the own device and a user space of the other device are arranged, based on image transmission information transmitted from the other device, such that the three-dimensional data is projected onto a two-dimensional display surface having a fixed relative position with respect to the shared virtual space, and which looks as if the person in the shared virtual space were being viewed from a viewpoint position of the own user through the display surface, on the display surface; and
an audio output unit configured to output audio on the basis of audio transmission information transmitted from the other device.

2. The communication terminal device according to claim 1, further comprising a person capture unit configured to continuously identify the viewpoint position of the own user on the basis of the visual information on the user space, wherein the image display unit is configured to track the identified viewpoint position to generate the display image and to display the display image on the display surface.

3. The communication terminal device according to claim 2, wherein
the person capture unit is configured to detect the own user on the basis of the visual information on the user space,
the information transmission unit is configured to transmit, to the other device, information representing a face part of the own user as the image transmission information when the own user is detected, and
the image display unit is configured to display, on the display surface, an image including a face image based on information representing a face part received from the other device.

4. The communication terminal device according to claim 3, wherein,
when the own user is detected, the information transmission unit is configured to further transmit, to the other device, information representing a skeleton of the own user as the image transmission information, and
the image display unit is configured to display, on the display surface, an image of the shared virtual space including a face image based on information representing a face part received from the other device and an image based on information representing a skeleton received from the other device.

5. The communication terminal device according to claim 1,
wherein the image display unit is configured to display, as a point group and/or a polygon mesh that are able to be processed, the person in the shared virtual space.

6. The communication terminal device according to claim 1,
wherein the audio output unit is configured to reproduce audio heard from a direction in which a user space of the other device is arranged in the shared virtual space on the basis of audio transmission information transmitted from the other device.

7. The communication terminal device according to claim 1,
wherein a predetermined position in the user space is defined as a user position, and
wherein the visual information acquisition unit includes a plurality of imagers configured to acquire visual information in respective imaging directions, the plurality of imagers being separated from each other, and having fixed relative positions with respect to the user position, and moreover being arranged with the imaging directions facing a direction in which at least a part of the user space is imaged, and
the information transmission unit is configured to, with respect to only an imager selected from a plurality of imagers of the other device on the basis of relative angles between the imaging directions of the imagers and a straight line connecting the user position of the other device and the user position of the own device, acquire, from the other device image transmission information based on visual information acquired by the selected imager.

8. The communication terminal device according to claim 1,
wherein a predetermined position in the user space is defined as a user position, and the visual information acquisition unit is configured to define a predetermined direction from the user position as a user direction, and includes a right imager arranged on a right side of the user direction and a left imager arranged on a left side of the user direction, and
the information transmission unit is configured to, when the user position of the other device is arranged on the right side of the user direction from the user position of the own device in the shared virtual space, acquire image transmission information including information from a right imager of the other device and including no information from a left imager of the other device, from the other device, and when the user position of the other device is arranged on the left side of the user direction from the user position of the own device in the shared virtual space, receive image transmission information including information from the left imager of the other device and including no information from the right imager of the other device, from the other device.

9. The communication terminal device according to claim 1, wherein
a predetermined position in the user space is defined as a user position, and a predetermined direction from the user position is defined as a user direction, and
the image display unit is configured to arrange the user position of at least one of the own device and the other device on each of a first line and a second line aligned next to each other and to form the shared virtual space such that the user direction of the device having the user position arranged on the first line serves as a direction toward the second line and the user direction of the device having the user position arranged on the second line serves as a direction toward the first line.

10. The communication terminal device according to claim 1,
wherein a predetermined position in the user space is defined as a user position and a predetermined direction from the user position is defined as a user direction, and
the image display unit is configured to arrange the user positions of the own device and the other device in a ring or polygonal shape and to form the shared virtual space such that user directions of the own device and the other device serve as a direction toward the inner side of the ring or the polygon.

11. The communication terminal device according to claim 1, wherein a predetermined position in the user space is defined as a user position and a predetermined direction from the user position is defined as a user direction, and
the image display unit is configured to arrange the user positions of the own device and the other device on a predetermined line and to form the shared virtual space such that user directions of the own device and the other device become the same direction with respect to the line.

12. The communication terminal device according to claim 1, wherein
a predetermined position in the user space is defined as a user position, and a predetermined direction from the user position is defined as a user direction, and
the image display unit includes a front display having a rectangular and planar display surface arranged in the user direction when viewed from the user position, a right display having a rectangular and planar display surface arranged on a right side of the user direction when viewed from the user position, and a left display having a rectangular and planar display surface arranged on a left side of the user direction when viewed from the user position, the display surface of the right display being close to a right edge of the display surface of the front display, and the display surface of the left display being close to a left edge of the display surface of the front display.

13. The communication terminal device according to claim 12, wherein the image display unit further includes
a lower display arranged in proximity to bottom edges of three displays of the front display, the left display, and the right display and having a display surface on a rectangular upper surface, and/or
an upper display arranged in proximity to ceiling edges of three displays of the front display, the left display, and the right display and having a display surface on a rectangular lower surface.

14. The communication terminal device according to claim 1, wherein
a predetermined position in the user space is defined as a user position, and
wherein the image display unit includes a front display having a rectangular and planar display surface arranged in a user direction, which is a predetermined direction when viewed from the user position, and
a lower display arranged in proximity to a bottom edge of the front display and having a display surface on a rectangular upper surface, and/or
an upper display arranged in proximity to an upper edge of the front display and having a display surface on a rectangular lower surface.

15. The communication terminal device according to claim 1, wherein
a predetermined position in the user space is defined as a user position, and
in the image display unit, the display surface is an inner surface surrounding the user position in a horizontal direction.

16. The communication terminal device according to claim 15, wherein the image display unit further includes a display having a display surface serving as an inner surface surrounding the user position in the horizontal direction,
a lower display arranged in proximity to a bottom edge of the display and having a display surface on an upper surface, and/or
an upper display arranged in proximity to an upper edge of the display and having a display surface on a lower surface.

17. The communication terminal device according to claim 1, wherein
a predetermined position in the user space is defined as a user position, and
in the image display unit, at least a part of the display surface near an outer edge is curved toward the user position.

18. The communication terminal device according to claim 17,
wherein the image display unit further includes a display having a display surface of which at least a part near the outer edge is curved toward the user position, and
a lower display arranged in proximity to a bottom edge of the display and having a display surface on an upper surface, and/or
an upper display arranged in proximity to an upper edge of the display and having a display surface on a lower surface.

19. The communication terminal device according to claim 1, wherein, in the image display unit, the display surface is an outer circumferential surface of a cylindrical shape.

20. The communication terminal device according to claim 1, further comprising an arrangement designation reception unit configured to display a screen, on which an object corresponding to the own device and an object corresponding to the other device are able to be movably arranged, and to receive designation of an arrangement of user spaces of the own device and the other device with respect to the shared virtual space according to an arrangement of the objects with respect to the screen.

21. The communication terminal device according to claim 1, wherein
the audio acquisition unit, the visual information acquisition unit, the information transmission unit, the image display unit, and the audio output unit are built in a housing, imagers of the visual information acquisition unit are arranged at predetermined position of the housing, and at least one or more external output terminals which are connected to at least one or more displays having a planar display surface and which output image data from the image display unit to the display are provided in the housing, and
the image display unit is configured to receive designation of a size of the display surface and a relative position and a relative posture of the display surface with respect to the housing, generate a display image which looks as if a person in the shared virtual space were being viewed from the viewpoint position of the own user through the display surface by projecting three-dimensional data of the person in the shared virtual space onto the display surface, on the basis of the designation, and output the display image from the external output terminal.

22. The communication terminal device according to claim 1,
wherein the information transmission unit is configured to complement information not included in the image transmission information regarding a part of a person included in the image transmission information.

23. The communication terminal device according to claim 1, further comprising an external connection terminal, wherein control information for receiving control with respect to at least one of the audio acquisition unit, the visual information acquisition unit, the person capture unit, the information transmission unit, the image display unit, and the audio output unit is received from the external connection terminal.

24. The communication terminal device according to claim 2, wherein the person capture unit is configured to detect that the own user has performed a predetermined operation, and
wherein at least one of the audio acquisition unit, the visual information acquisition unit, the information transmission unit, the image display unit, and the audio output unit executes processing corresponding to the operation.

25. The communication terminal device according to claim 2, wherein
the person capture unit is configured to detect a first operation of the own user placing a hand thereof over an object in the shared virtual space and a second operation of moving a grasped hand toward the object, and the image display unit is configured to move the object when the second operation is detected after the first operation is detected and not to move the object even when the second operation is detected without detection of the first operation.

26. The communication terminal device according to claim 1,
wherein the image display unit includes a display device configured to display the image on the display surface and a three-dimensional glasses device worn by the user, and
the display device generates a left-eye image and a right-eye image having a parallax, depending on the viewpoint position, and displays the left-eye image and the right-eye image on the display surface, and
the three-dimensional glasses device shows the left-eye image to left eye of the own user and shows the right-eye image to the right eye of the own user.

27. The communication terminal device according to claim 2, wherein the person capture unit is configured to, when designation of a desired mental state is received, process a face part of the own user in the visual information into an expression representing the mental state, and
the information transmission unit is configured to transmit image transmission information based on visual information, in which the face part of the own user has been processed, to the other device.

28. A communication method using a plurality of communication terminal devices interconnected via a communication line, the communication method comprising by using each of the communication terminal devices:
acquiring audio including a voice of an own user using an own device;
acquiring visual information for enabling formation of three-dimensional data of a person in a predetermined user space;
transmitting, to another device, image transmission information based on visual information on the user space and audio transmission information based on the audio;
displaying a display image which is generated by performing a projection transformation on three-dimensional data of a person in a shared virtual space, in which a user space of the own device and a user space of the other device are arranged, based on image transmission information transmitted from the other device, such that the three-dimensional data is projected onto a two-dimensional display surface having a fixed relative position with respect to the shared virtual space, and which looks as if the person in the shared virtual space were being viewed from a viewpoint position of the own user through the display surface, on the display surface; and
outputting audio on the basis of audio transmission information transmitted from the other device.

29. A non-transitory computer readable storage medium that stores a software program for causing a computer to operate as a control device of a plurality of communication terminal devices interconnected via a communication line, the software program causing the computer to execute a procedure comprising:
acquiring audio including a voice of an own user using an own device;
acquiring visual information for enabling formation of three-dimensional data of a person in a predetermined user space;
transmitting, to another device, image transmission information based on visual information on the user space and audio transmission information based on the audio;
displaying a display image which is generated by performing a projection transformation on three-dimensional data of a person in a shared virtual space, in which a user space of the own device and a user space of the other device are arranged, based on image transmission information transmitted from the other device, such that the three-dimensional data is projected onto a two-dimensional display surface having a fixed relative position with respect to the shared virtual space and which looks as if the person in the shared virtual space were being viewed from a viewpoint position of the own user through the display surface, on the display surface; and
outputting audio on the basis of audio transmission information transmitted from the other device.

* * * * *